(12) United States Patent
Townsend et al.

(10) Patent No.: US 12,312,255 B2
(45) Date of Patent: May 27, 2025

(54) TREATING PER- AND POLY-FLUOROALKYL SUBSTANCES IN LANDFILL LEACHATE

(71) Applicant: University of Florida Research Foundation, Inc., Gainesville, FL (US)

(72) Inventors: Timothy G Townsend, Gainesville, FL (US); John Alfred Bowden, Newberry, FL (US); Michael D Annable, Gainesville, FL (US); Nicole Robey, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 366 days.

(21) Appl. No.: 17/911,903

(22) PCT Filed: Mar. 16, 2021

(86) PCT No.: PCT/US2021/022492
§ 371 (c)(1),
(2) Date: Sep. 15, 2022

(87) PCT Pub. No.: WO2021/188493
PCT Pub. Date: Sep. 23, 2021

(65) Prior Publication Data
US 2023/0127819 A1 Apr. 27, 2023

Related U.S. Application Data

(60) Provisional application No. 63/027,450, filed on May 20, 2020, provisional application No. 62/990,156, filed on Mar. 16, 2020.

(51) Int. Cl.
B01D 21/00 (2006.01)
B01D 21/24 (2006.01)
(Continued)

(52) U.S. Cl.
CPC ............ *C02F 1/24* (2013.01); *B01D 21/0027* (2013.01); *B01D 21/0042* (2013.01);
(Continued)

(58) Field of Classification Search
CPC ..... C02F 1/24; C02F 2101/36; C02F 2103/06
See application file for complete search history.

(56) References Cited

U.S. PATENT DOCUMENTS

2019/0176101 A1  6/2019  Phillips et al.
2019/0300387 A1  10/2019  Nelson

FOREIGN PATENT DOCUMENTS

WO     2019111238 A1    6/2019

OTHER PUBLICATIONS

ISR Mailed Jun. 2, 2021; International Patent Application PCT/US2021/22492 filed Mar. 16, 2021, pg.
(Continued)

*Primary Examiner* — Bradley R Spies
(74) *Attorney, Agent, or Firm* — Thomas | Horstemeyer LLP

(57) ABSTRACT

The present disclosure provides for devices, systems, and methods of separating PFAS compounds from wastewater leachate. After separation, the PFAS compounds can be rendered less harmful. The present disclosure provides for devices, systems, and methods that uses aeration-induced foaming to isolate PFAS from landfill leachate into a concentrated, volume reduced liquid (coalesced foam), which can be separated and treated.

19 Claims, 8 Drawing Sheets

(51) Int. Cl.
*C02F 1/24* (2023.01)
*C02F 1/40* (2023.01)
*C02F 101/36* (2006.01)
*C02F 103/06* (2006.01)

(52) U.S. Cl.
CPC ...... *B01D 21/0084* (2013.01); *B01D 21/2411* (2013.01); *C02F 1/40* (2013.01); *C02F 2101/36* (2013.01); *C02F 2103/06* (2013.01); *C02F 2301/028* (2013.01)

(56) References Cited

OTHER PUBLICATIONS

Yin T. et al., "Perfluoroalkyl and polyfluoroalkyl substances removal in a full-scale tropical constructed welland system treating landfill leachate". Water Research, 2017, vol. 125, pp. 418-426.

Meng P. et al., Efficient removal of perfluorooctane sullonate from aqueous film-forming foam solution by aeration-foam collection, Chemosphere, 2018, vol. 203, pp. 263-270.

Trojanowicz M. ct al., Advanced Oxidation/Reduction Processes treatment for aqueous pertluorooctanoate (PFOA) and perfluorooctanesulfonate (PFOS) • A review of recent advances, 2018, vol. 336, pp. 170-199.

US 12,312,255 B2

TREATING PER- AND POLY-FLUOROALKYL SUBSTANCES IN LANDFILL LEACHATE

CLAIM OF PRIORITY TO RELATED APPLICATION

This application is the 35 U.S.C. § 371 national stage of PCT application having serial number PCT/US2021/022492, filed on Mar. 16, 2021. PCT/US2021/022492 claims priority to U.S. provisional application entitled "TREATING PER-AND POLY-FLUOROALKYL SUBSTANCES IN LANDFILL LEACHATE," having Ser. No. 63/027,450 filed on May 20, 2020, and to U.S. provisional application entitled "TREATING PER-AND POLY-FLUOROALKYL SUBSTANCES IN LANDFILL LEACHATE," having Ser. No. 62/990,156 filed on Mar. 16, 2020, each of which are entirely incorporated herein by reference.

FEDERAL FUNDING

This invention was made with government support under grant number 83962001 awarded by the United States Environmental Protection Agency. The government has certain rights in the invention.

BACKGROUND

Large volumes of per- and/or polyfluoroalkyl-contaminated substances (PFAS-contaminated substances) wastewaters, such as municipal solid waste landfill leachates, pose a challenge for PFAS treatment technologies in practice today. While various techniques have been used, each of them possesses their own unique challenges as it pertains to wastewater leachate. Thus, there is a need to find alternative approaches.

SUMMARY

The present disclosure provides for devices, systems, and methods of separating PFAS compounds from wastewater leachate. After separation, the PFAS compounds can be rendered less harmful. The present disclosure provides for devices, systems, and methods that uses aeration-induced foaming to isolate PFAS from landfill leachate into a concentrated, volume reduced liquid (coalesced foam). The foam can then be separated and treated.

An aspect of the present disclosure provides for a method of separating per- and/or polyfluoroalkyl compounds (PFAS compounds) from a wastewater leachate contaminated with PFAS compounds, comprising: foaming the wastewater leachate contaminated with PFAS compounds for a period of time to form a foam layer on top of the wastewater leachate and a de-foamed wastewater leachate, wherein the foam layer comprises a concentrated amount of PFAS compounds relative to that present in the wastewater leachate, wherein the de-foamed wastewater leachate has a lower concentration of total PFAS compounds than the wastewater leachate; and separating the foam layer from the de-foamed wastewater leachate; and optionally processing the foam layer. The foaming can include bubble aeration of the wastewater leachate that can include artificial bubble aeration introduced using a bubble aeration system. The bubble aeration system can produce bubbles within the wastewater leachate for a period of time sufficient to form the foam layer. The bubbles have a sufficient bubble size and air-to-liquid volume, and contact time with the wastewater leachate to form the foam layer. The PFAS compounds can include perfluorooctanoic acid (PFOA), perfluorooctanesulfonic acid (PFOS), or a combination thereof. The processing can include processing using an electron beam, processing using a plasma, processing by incineration, processing by oxidation, or a combination thereof. After processing any residual water can be returned, reclaimed, or recycled.

The present disclosure provides for a system for removing per- and/or polyfluoroalkyl compounds (PFAS compounds) from wastewater leachate contaminated with PFAS compounds, comprising: a bubble aeration system comprising an air flow device in communication with a bubble aeration device, wherein the bubble aeration device is within pre-foamed wastewater leachate contaminated with PFAS compounds, wherein the bubble aeration device is configured to produce bubbles from the air flow from the air flow device, wherein the bubbles form a foam layer on top of the wastewater leachate, wherein the foam layer comprises a concentrated amount of PFAS compounds relative to that present in the pre-foamed wastewater; a separating system configured to remove a portion of the foam layer from the surface of the wastewater leachate; and optionally a processing system includes a device that renders the PFAS compounds less hazardous relative to before processing than PFAS compound. The air flow device can be an air generator or pump and wherein the bubble aeration device is a structure that is configured to form bubbles as air is flowed through the bubble aeration device. The separating system can include a structure that is configured to skim the foam layer off of the surface of the wastewater leachate, optionally wherein the structure is a skimmer or a baffle. The processing system can include: an electron beam device, a plasma device, an incineration device, an oxidation device, or a combination thereof.

The present disclosure provides for a device for removing per- and/or polyfluoroalkyl compounds (PFAS compounds) from wastewater leachate contaminated with PFAS compounds, comprising: an air flow device in communication with a bubble aeration device, wherein the bubble aeration device is within pre-foamed wastewater leachate contaminated with PFAS compounds, wherein the bubble aeration device is configured to produce bubbles from the air flow from the air flow device, wherein the bubbles form a foam layer on top of the wastewater leachate, wherein the foam layer comprises a concentrated amount of PFAS compounds relative to that present in the pre-foamed wastewater; a separating device that is configured to remove a portion of the foam layer from the surface of the wastewater leachate; and optionally a processing system includes a device that renders the PFAS compounds less hazardous relative to before processing than PFAS compound. The air flow device can be an air generator or pump and wherein the bubble aeration device is a structure that is configured to form bubbles as air is flowed through the bubble aeration device. The separating device can include a structure (e.g., skimmer, baffle, and the like) that is configured to skim the foam layer off of the surface of the wastewater leachate, optionally wherein the structure is a skimmer or a baffle. The processing system can include: an electron beam device, a plasma device, an incineration device, an oxidation device, or a combination thereof.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
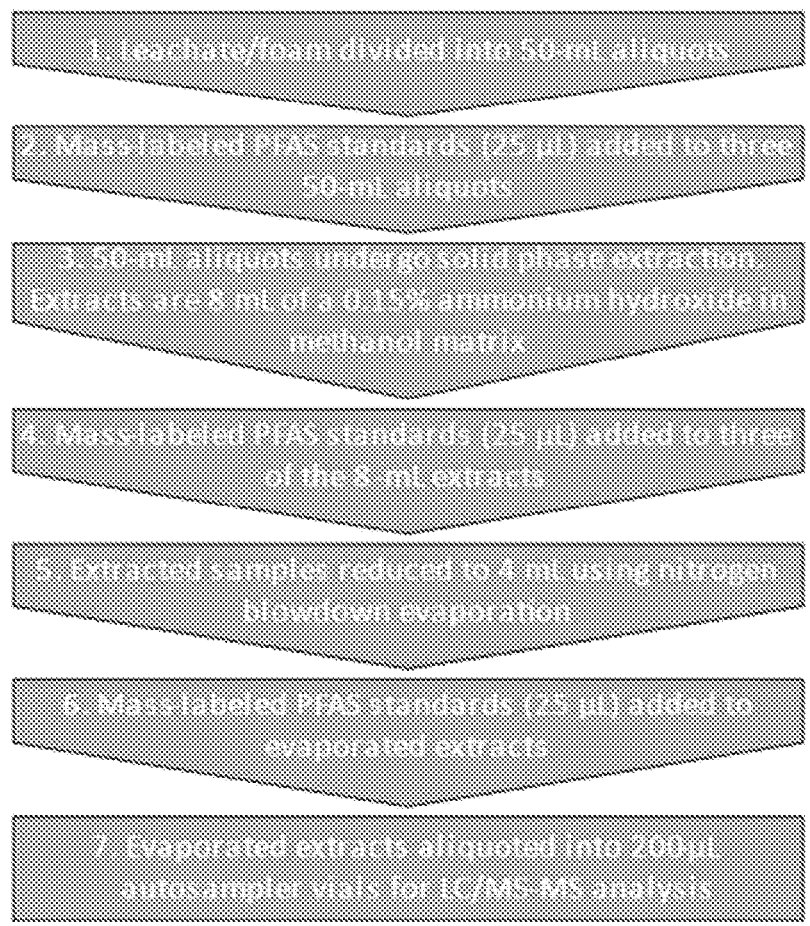
FIG. 1 illustrates landfill leachate PFAS extraction efficiency experiment flow diagram. The ratio between average peak area for aliquots spiked in step 2 and step 4 is the solid phase extraction efficiency, and the ratio between average peak area for aliquots spiked in step 2 and step 6 is the total preparation efficiency.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Aspects of the present disclosure provide for devices, systems, and methods of separating PFAS compounds from wastewater leachate. After separation, the PFAS compounds can be rendered less harmful. The present disclosure provides for devices, systems, and methods that uses aeration-induced foaming to isolate PFAS from landfill leachate into a concentrated, volume reduced liquid (coalesced foam). Dilute waste streams are usually poor candidates for high energy destructive PFAS treatment methods (e.g., sonication, chemical oxidation, electron beam, plasma). Landfill leachate is a more concentrated waste stream, which can be further concentrated using this technique.

The surfactant properties of PFAS are exploited to concentrate the PFAS compounds in a foam layer that can be produced via the bubble aeration of landfill wastewater leachate. Initial testing shows that the effectiveness of the foaming technique for concentrating PFAS varied by compound, with a mean removal percentage (the percent difference between PFAS in leachate before and after foam removal) of about 69% and a median removal percentage of about 92% among the ten replicate foaming experiments. The effectiveness can vary depending upon various factors such as the wastewater leachate contents, pH, presence of other materials in the leachate, and the like. An advantage of this technique is that it appears to be similarly effective at sequestering sulfonates and carboxylate PFAS compounds. The results suggest that for the pretreatment or preconcentration of landfill leachates, foaming to sequester PFAS is a practical approach that optionally could be strategically coupled to high energy PFAS-destructive treatment technologies. The process described herein is simple and could feasibly be applied at a relatively low cost at most landfills.

Per- and polyfluoroalkyl substances (PFAS) are manmade compounds that have been used to manufacture consumer products and industrial chemicals such as aqueous film forming foams (AFFFs). PFAS substances and related compounds such as PFAS precursors can be referred to as PFAS compounds. PFAS compounds can include perfluorobutyric acid (PFBA), perfluoropentanoic acid (PFPeA), perfluorobutane sulfonate (PFBS), perfluorohexanoic acid (PFHxA), perfluoroheptanoic acid (PFHpA), perfluorohexane sulfonate (PFHxS), 6:2 fluorotelomer sulfonate (6:2 FTS), perfluorooctanoic acid (PFOA), perfluoroheptane sulfonate (PFHpS), perfluorooctane sulfonate (PFOS), perfluorononanoic acid (PFNA), and 8:2 fluorotelomer sulfonate (8:2 FTS), as well other compounds and precursor materials used to make these compounds. The PFAS compounds can include perfluorooctanoic acid (PFOA), perfluorooctanesulfonic acid (PFOS), or a combination thereof.

Figure 8:
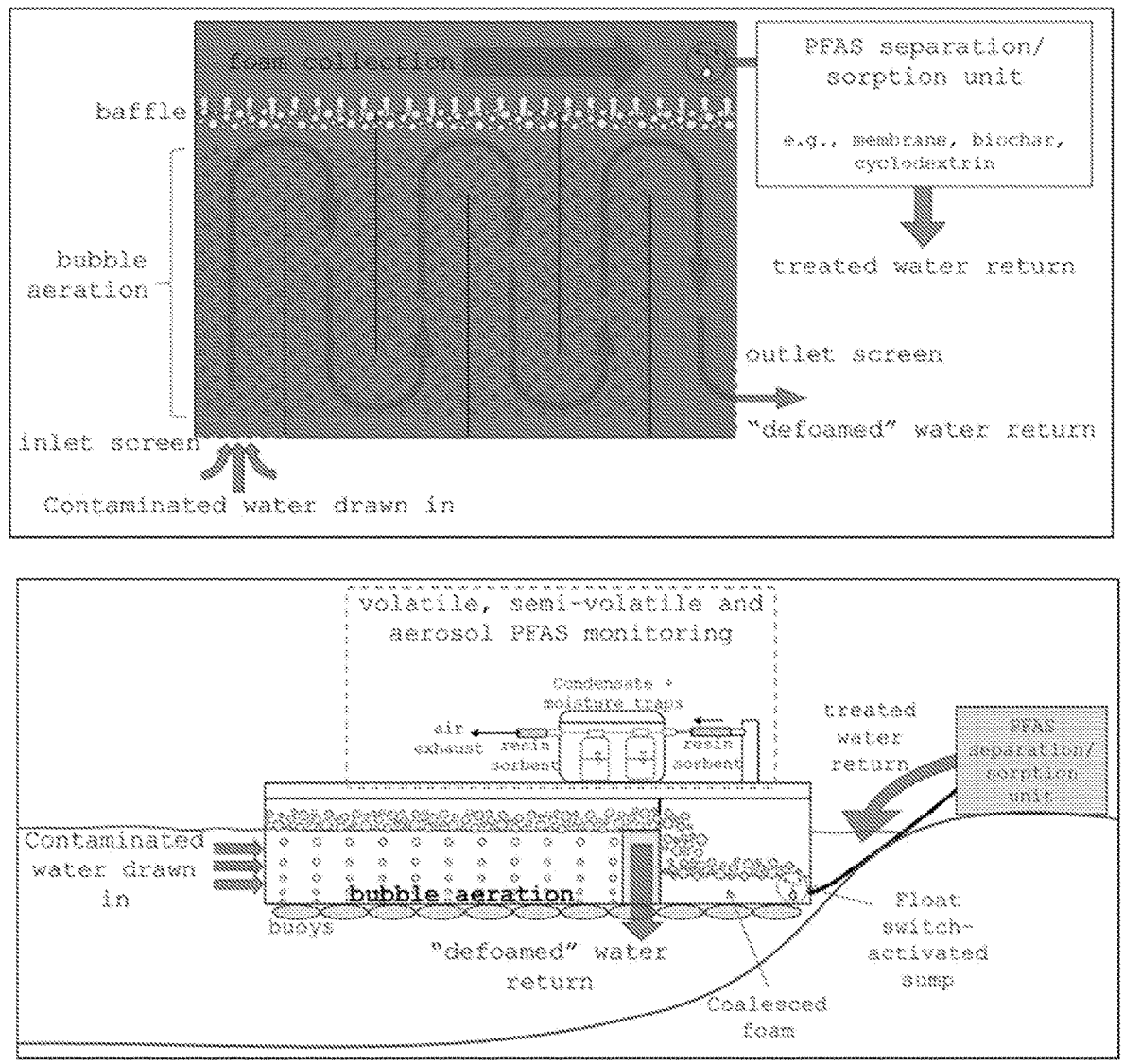
FIG. 8 is an aerial (top diagram) and elevation (bottom diagram) view of a device or system of the present disclosure that is a field scale PFAS removal treatment train.

The present disclosure provides for devices, systems, and methods of separating PFAS compounds from wastewater leachate contaminated with PFAS compounds and processing the separated PFAS. The wastewater leachate prior to foaming can be referred to as "pre-foamed wastewater leachate" or "wastewater leachate" while after foaming it is referred to as de-foamed wastewater leachate. It should be stated that the same volume of wastewater leachate can be subjected to the foaming process multiple separate times and/or continuously. The foaming process includes aerating the wastewater leachate that may be contaminated with PFAS compounds. In one instance, the wastewater leachate may be known to be contaminated while in another it may be suspected to be contaminated. The foaming process includes operating a bubble aeration device (e.g., fine bubble diffusers or microbubble diffusers) in contact (e.g., disposed within) with wastewater leachate using specified bubble size, air-to-liquid volume, and contact time, followed by physical separation of the foam from the leachate using a separating device or system that can include baffles or skimmers (e.g., industrial baffles or skimmers to process large volumes of wastewater). In an aspect, the wastewater leachate is flowed in a straight or serpentine, curving, winding, or sinuous path (e.g., see FIG. 8), where the wastewater leachate is subjected to the foaming process (e.g., exposed the bubble from the bubble aeration device) along portions or the entire path or at the end of the path. The separating device or system can be configured to separate the foam a various positions along the path and/or at the end of the path. The characteristics, volumes and manner of collection of landfill leachate differs from domestic water or groundwater. Foam separation units can be placed at individual leachate collection points (pump station, sumps), at storage facilities, or inline with other treatment unit operations. Foam separation units can be fixed or can be mobile, where in some instances the unit can float on the surface of the wastewater leachate in a pond or other body of water.

During the foaming process, after a period of time (e.g., minutes to an hour or more), a foam layer is formed on top of the wastewater leachate (now referred to as de-foamed wastewater leachate). The foam layer comprises a concentrated amount of PFAS compounds relative to that present in the pre-foamed wastewater. The de-foamed wastewater leachate has a lower concentration (e.g., a reduction of about 10-90%, about 10-70%, about 10-50, or about 10-30%) of total PFAS compounds than the pre-foamed wastewater leachate. The reduction in the concentration can be obtained by measuring before and after foaming. Also, those measurements can be compared to what is found in the foam layer. The path which the wastewater leachate follows can be made longer to reduce the PFAS compounds and/or the wastewater leachate can be processed multiple times to reduce the PFAS compounds.

After foaming or even during the foaming process, the foam layer can be separated from the de-foamed wastewater leachate. The foaming process can be continuous or for set periods of time and the wastewater leachate can be foamed multiple times to reduce the amount of PFAS compounds down to the desired levels. The separation can be conducted by skimming off the foam layer manually or in an automated manner during the foaming process or after the foaming process is stopped.

Once the foam layer is separated, the foam layer (which may revert back to a liquid form after sufficient time) can be further processed on site or separately. Processing the foam layer renders the PFAS compounds less hazardous relative to before processing than PFAS compounds. The processing can include processing using an electron beam, processing using a plasma, processing by incineration, processing by oxidation, or a combination thereof.

Having described the present disclosure, additional details are provided below. The present disclosure provides for methods of separating per- and/or polyfluoroalkyl compounds (PFAS compounds) from a wastewater leachate contaminated with PFAS compounds. The method can include the following steps. The first step is foaming the wastewater leachate contaminated with PFAS compounds for a period of time (e.g., minutes to hours or more (e.g., 10 min to 24 hours)) to form a foam layer on top of the wastewater leachate and a de-foamed wastewater leachate. The foam layer includes a concentrated amount of PFAS compounds relative to that present in the wastewater leachate. In particular, the foam layer can include 10 to 90% of the PFAS compounds that were present in the wastewater leachate prior to treatment. The de-foamed wastewater leachate has a lower concentration of total PFAS compounds than the wastewater leachate. In other words, as the foam is made, the foam removes PFAS compounds from the wastewater leachate. The foam layer can be separated from the de-foamed wastewater leachate and optionally further processed.

The foaming step includes bubble aeration of the wastewater leachate. The bubble aeration includes artificial bubble aeration using a bubble aeration system. In other words, the foam is not formed using natural processes caused by the natural flow of the wastewater leachate, where foam that might be generated is soon converted based to a fluid, so that an equilibrium naturally exists, whereas the foam layer described herein is formed using bubble aeration. The bubble aeration system includes producing bubbles within the wastewater leachate for a period of time sufficient (e.g., minutes to hours to a day or more) to form the foam layer. In particular, the bubbles formed have a sufficient bubble size (e.g., about 50 to 150 µm, or about 75 to 125 µm, or about 100 µm) and air-to-liquid volume (e.g., approximately about 10:1, about 7:1, or about 4:1), and contact time (e.g., about 1 to 10 minutes, or about 1 to 7 minutes, or about 2 to 5 minutes) with the wastewater leachate to form the foam layer.

The foaming step and the separating step can occur concurrently in that as soon as foam is formed the foam layer can be separated. Alternatively, the foaming step and separating step occurs sequentially, where in one aspect, the method includes alternating between forming and separation for a period of (e.g., time hour to days to weeks).

The separating step includes separating the foam layer form the wastewater leachate using devices such as baffles or skimmers such as those used in industrial processes. The baffle or skimmer can be positioned just above or just below the wastewater leachate to remove the foam layer, where the baffle or skimmer is moving across the wastewater leachate and/or the wastewater leachate is flowing past the baffle or skimmer.

Once the foam layer is separated from the wastewater leachate, the foam layer can be processed. In general, the foam quickly converts back into fluid. The foam (or fluid) can be subjected to processing to breakdown the PFAS compounds into less hazardous compounds. The processing that can be used to breakdown the PFAS compounds can include processing using an electron beam, processing using a plasma, processing by incineration, processing by oxidation, or a combination thereof.

The present disclosure also provides for systems for removing per- and/or polyfluoroalkyl compounds (PFAS compounds) from wastewater leachate contaminated with PFAS compounds. The system can include a bubble aeration system, a separating system, and optionally a processing system. Each component of the overall system can be in communication (e.g., via a computer or otherwise) with one another so that the foam layer is formed, separated, and optionally processed. The bubble aeration system can include an air flow device (e.g., air generator or pump) in gaseous communication with a bubble aeration device (e.g., fine bubble diffusers or microbubble diffusers). The bubble aeration device is within wastewater leachate that is contaminated with PFAS compounds and is configured to produce bubbles from the air flow from the air flow device. The bubbles cause the formation of a foam layer on top of the wastewater leachate, where the foam layer comprises a concentrated amount of PFAS compounds relative to that present in the pre-foamed wastewater.

The separating system is configured to remove a portion of the foam layer from the surface of the wastewater leachate using a device such as a baffle or skimmer. The separating system collects the foam layer, which can then be processed. The separating system can be in communication with the bubble aeration system so that the device can separate the foam layer at the appropriate time or can be operated in a continuous manner if the bubble aeration system is continuously producing bubbles. The separating system can be in communication electronically or mechanically with the processing system so that the foam layer (or fluid therefrom) can be moved to an appropriate area to be processed.

The processing system includes a device(s) that renders the PFAS compounds less hazardous relative to before processing than PFAS compound. The processing system can include an electron beam device, a plasma device, an incineration device, an oxidation device, or a combination thereof, where each can decompose the PFAS compounds to less hazardous compounds.

The present disclosure also provides for devices for removing per- and/or polyfluoroalkyl compounds (PFAS compounds) from wastewater leachate contaminated with PFAS compounds. The device can include a bubble aeration device, a separating device, and optionally a processing device. Each component of the overall device can be in communication (e.g., via a computer or otherwise) with one another so that the foam layer is formed, separated, and optionally processed. The bubble aeration device can include an air flow device (e.g., air generator or pump) in gaseous communication with a bubble aeration device (e.g., fine bubble diffusers or microbubble diffusers). The bubble aeration device is within wastewater leachate that is contaminated with PFAS compounds and is configured to produce bubbles from the air flow from the air flow device. The bubbles cause the formation of a foam layer on top of the wastewater leachate, where the foam layer comprises a concentrated amount of PFAS compounds relative to that present in the pre-foamed wastewater.

The separating device is configured to remove a portion of the foam layer from the surface of the wastewater leachate using a device such as a baffle or skimmer. The separating device collects the foam layer, which can then be processed. The separating device can be in communication with the bubble aeration system so that the device can separate the foam layer at the appropriate time or can be operated in a continuous manner if the bubble aeration device is continuously producing bubbles. The separating device can be in communication electronically or mechanically with the processing device so that the foam layer (or fluid therefrom) can be moved to an appropriate area to be processed.

The processing device includes a device(s) that renders the PFAS compounds less hazardous relative to before processing than PFAS compound. The processing device can include an electron beam device, a plasma device, an incineration device, an oxidation device, or a combination thereof, where each can decompose the PFAS compounds to less hazardous compounds.

In an aspect, the bubble aeration device or system and the separating device or system are within a single structure. The single structure can include a straight flow path or can have a serpentine, curving, winding, or sinuous path flow path having an entrance for the wastewater leachate and an exit for defoamed water. The bubble aeration system (e.g., bubble aeration device) can produce bubbles along portions or all along the flow path. The separating system or device can be designed to skim the foam layer off of the surface of the wastewater leachate along the flow path or at or near the exit of the flow path. The single structure is configured to float in a body of wastewater leachate. In an aspect, the single structure including the bubble aeration system or device and the separating system or device can be part of a single unit that is configured to float on a body of water and positioned within the body of water. The processing system or device can be part of the single unit or can be positioned on land, where when positioned on land, the processing system or device can be in fluidic communication with the separating system of the single unit so that the separated foam can be flowed from the single unit to the processing system or device and residual treated water can be flowed back to original body of water, for example, or otherwise processed. This configuration allows the single unit to be moved between bodies of water. In other aspects, the system or device for removing PFAS compounds can be a constructed as a stationary unit and wastewater leachate is flowed into the system.

Example 1

Per- and polyfluoroalkyl substances (PFAS) are an expansive family of manmade compounds used in many commercial and industrial applications. Concern regarding environmental and human exposure to PFAS has become the subject of extensive research 1-4, and the case has been consistently made regarding the value of continued PFAS research in numerous works detailing their presence (5-7), persistence (8-10), and fate and transport (11-14). Because they typically discharge to the environment, municipal wastewater treatment plants (WWTP) have been the subject of scrutiny over PFAS levels in their effluent (15-20). As a result, facilities increasingly refuse to accept high strength industrial wastewaters rather than attempt to treat or remove the PFAS and other contaminants from large volumes of comparatively dilute sewage. Landfill leachate—the liquid formed when moisture comes into contact with waste in a landfill—is one such industrial wastewater.

Modern, sanitary municipal solid waste (MSW) landfills are engineered to use space efficiently and to prevent excessive rainwater intrusion into the waste mass (21). To protect groundwater and the surrounding environment, water which does migrate into the landfill, now leachate, is collected on a low permeability liner system and removed for disposal or treatment. Often the leachate is sent to a WWTP, though in some cases it is treated and discharged on site, or disposed of using deep well injection (22). Landfill leachate is a complex matrix (23) containing the products of anaerobic decomposition and leaching from a wide variety of waste materials. Broadly speaking, landfill leachate from a mature MSW landfill contains high concentrations of ammonia, chemical oxygen demand (COD) and salts, with trace levels of many metals and metalloids such as arsenic and antimony (24). Leachates can also contain measurable levels of other contaminants of concern, such as pesticides (25), pharmaceuticals (26), and, of immediate interest, PFAS (27-29); if it is found in the waste, it is likely to be found in the leachate (30-32).

Due to their widespread use and resistance to degradation, several PFAS compounds have been found at elevated concentrations in leachates (33,34). Of the more than 5,000 individual compounds referred to as PFAS, only two—perfluorooctanoic acid (PFOA) and perfluorooctanesulfonic acid (PFOS)—have been sufficiently evaluated to receive risk-based exposure guidance by the U.S. Environmental Protection Agency (35,36), and some state agencies, including the State of Florida Department of Environmental Protection (FDEP), have released provisional risk-based thresholds for non-drinking water, such as groundwater cleanup target levels (GCTLs) (37) based on the EPA guidance. Despite being phased out of use decades ago, both compounds are still routinely found in MSW landfill leachates at concentrations orders of magnitude higher than the 70 ng L−1 (combined concentration of PFOA and PFOS) EPA Lifetime Drinking Water Health Advisory and FDEP provisional GCTL (34,38). While the implications of these elevated concentrations in leachate have yet to be determined, the need for treatment and/or pretreatment technologies is clear. Due to the high concentrations of PFAS and relatively low volume, which is typically a fraction of the flow rates for WWTPs serving the same population, landfill leachates can play an important role with respect to PFAS fate and transport from consumer products to the environment. Additionally, high concentrations of PFAS in leachate provide opportunities to implement advanced treatment technologies which may not be feasible for the larger volumes and lower concentrations typically observed in a WWTP or contaminated waterbodies (39). Wei et al. (40) reviewed the current understanding of PFAS in landfill leachate and the most common PFAS treatment technologies in terms of effectiveness and feasibility. Treatment methods can be categorized as either separation (e.g., reverse osmosis (RO), activated carbon adsorption) or destructive technologies (e.g., electron beam, plasma, incineration, oxidation, sonication). PFAS destruction is usually an energy- or chemical-intense process and may require large capital investments and operational costs, making them impractical for many landfill- or WWTP-scale applications. The most effective separation technologies described in the literature come with their own disadvantages—e.g., the complexity and chemical nature of landfill leachate can cause RO membrane fouling, and all separation methods produce a contaminated residual (such as highly concentrated RO retentate or spent activated carbon) which must then be further treated or disposed. Wei et al.'s review briefly describes an in-situ foam fractionation application—similar in principal to the work described in this manuscript—for extracting PFAS from groundwater in wells. The review describes the technology as infeasible for groundwater due to the limited access to PFAS-contaminated water in wells and uncertainty about the cost versus removal efficiency. Foam separation of PFAS has been described elsewhere in the literature. Meng et al. (41) reported removal of select PFAS (PFBS, PFHxS, PFOS, PFOA and OBS) from AFFF-contaminated water and a synthetic PFOS solution using bubble aeration, and Ebersbach et al. (42) investigated the role of foam partitioning and aerosolization as removal mechanisms for 6:2 FTS (as well as select PFAAs) in electroplating wastewaters.

Here, we explore a treatment approach that takes advantage of the surfactant properties of several PFAS compounds to remove PFAS from MSW landfill leachate and explore PFAS characteristics associated with the phenomenon. Many species of PFAS tend to partition to the interface between air and water, oil and water and water and solids (43,44) and the surfactant properties of a few select PFAS species have been described in the literature (45-48). Surfactants, such as PFAS, are often used to generate foam for applications such as fire-fighting, sometimes referred to as aqueous film-forming foams, or AFFFs, a frequent source of PFAS contamination (49-51). Landfill leachates, like many wastewaters, are known to have foaming issues. By inducing leachate foaming (i.e., generating a high air-water interfacial area) and separating the foam from the "defoamed" leachate, PFAS may then be concentrated in the foam, which subsequently coalesces back into a liquid form. Pretreatment methods common in landfill leachate collection systems include aeration, which has proven ineffective by itself for the treatment of PFAS (52). Previous studies and our findings suggest that existing treatment technologies such as dissolved air floatation (DAF) might be an effective component of a treatment train for PFAS in leachate, producing a low volume, high concentration residual which could be further subjected to stabilization or possible thermal treatment (similar to concentrated residuals from membrane technologies).

The primary objectives of this study were to (1) investigate the partitioning of mass-labeled PFAS "tracers" from leachate into foam in ten replicate experiments (reported as percent removed from leachate); (2) describe the partitioning rate of PFAS into the foam by assessing sequential foam fractions; (3) relate the partitioning results to structural characteristics of both the native and mass-labeled PFAS (e.g., implication of chain length, functional groups); (4) examine the extraction efficiency (and quantified levels for a triplicate set) of both landfill leachate and foam; and (5) and provide context regarding the implications of how foam sequestration of PFAS from leachate may lead to better overall PFAS removal solutions.

Materials and Methods

Mass-Labeled PFAS Tracer Experiment

Ten replicate experiments were designed to promote the foaming of landfill leachate, followed by the systematic removal and collection of the foam for subsequent PFAS analysis. The pre-foamed leachate, as well as defoamed leachate were also analyzed for PFAS. The leachate was collected from a 20-year old cell of an active MSW landfill in central Florida, U.S.A., via leachate lift station in a 20-L HDPE carboy and homogenized gently, with care taken not to agitate and induce foaming, before aliquots were collected for this experiment. In brief, the setup included 1,000-mL glass beakers with 750 mL of leachate added, in addition to a 750 μL spike of a mass-labeled PFAS mixture (see Supplemental Table S1 for more information; ~20 ng/g in methanol; derived from Wellington Laboratories using two retail mixtures—MPAC-C-ES and MFTA-MXA and several individually purchased compounds). The mass-labeled PFAS spike served as a "tracer", providing a means to follow the fate of each PFAS during the foaming process. The spike was gently added and stirred into the leachate for 60 s. Prior to the initiation of the experiment, one 50-mL aliquot of the spiked leachate was collected from each beaker as the untreated leachate sample and was saved for later analysis via ultra-high performance liquid chromatograph-tandem mass spectrometry (UHPLC-MS/MS). One sintered glass aquarium air stone, spherical and approximately 4 cm in diameter with a pore size of 100 μm, connected to an 8 watt, four-outlet air pump using methanol-rinsed polypropylene tubing, was submerged into each leachate beaker. The air stones were used to bubble air and, subsequently, induce substantial foaming in the landfill leachate. All materials were washed using laboratory cleaner and decontaminated with HPLC grade methanol prior to use.

When the air pump was turned on, air was bubbled through the leachate at approximately 2.6 L min−1 and foam began to form immediately. A stainless-steel mesh skimmer was used to collect foam as necessary to prevent foam from overflowing from the beaker, approximately every 10-15 seconds, and was transferred to an HDPE funnel mounted on a pre-weighed 250 mL HDPE bottle. Foam quickly coalesced back into a liquid form and once foam generation slowed, the air pump was turned off, the sintered glass stone was removed and a "defoamed" 50-mL aliquot of leachate was collected from the beaker and saved for later analysis. The bottles were weighed after collection to determine the mass of foam collected from each beaker. This process was repeated for ten beakers—seven as described, and three modified to collect the foam sequentially in 50-mL aliquots to compare PFAS in the first foam collected versus subsequent 50-mL fractions.

Extraction and LC-MS/MS Analysis Leachate, foam, "defoamed" leachate samples and blanks underwent solid phase extraction developed specifically for landfill leachate samples. One 50-mL aliquot of leachate, "defoamed leachate" and foam (subsampled from the 250-mL bottles of coalesced foam) was extracted for each replicate experiment. Each full 50-mL sample bottle was weighed before and after extraction to normalize concentration and/or peak areas during data processing. Before extraction, sample pH was adjusted to 4-5 using glacial acetic acid (Fisher Scientific) and samples were centrifuged to remove/isolate suspended solids. Samples were extracted using Phenomenex solid phase extraction cartridges (Strata-X-AW 100 μm Polymeric Weak Anion 500 mg/6 mL). The cartridges were conditioned with 4 mL of 0.3% ammonium hydroxide in methanol, 3 mL of methanol and 4 mL of an ammonium acetate buffer before samples were loaded using a 60 mL reservoir attachment. The loaded cartridges were rinsed with 4 mL of ammonium acetate buffer, then eluted into 15-mL HDPE tubes using 4 mL each of methanol and 0.3% ammonium hydroxide in methanol. Eluted extracts were evaporated from approximately 8 mL to 4 mL using a Biotage TurboVap nitrogen evaporator at 28° C.

To monitor potential sources of contamination in this process, one quality control sample was collected in the field (field blank), and the foaming procedure was repeated in triplicate using 750 mL of reagent grade water (no mass-labeled PFAS tracer added). For these three control experiments, a 50 mL aliquot was collected from the beaker, then air was bubbled using identical air stones for a period of 15 min. No foam was generated in any of the control tests, and 50 mL "after" aliquots were collected at the end of the 15 min process. Additional blanks were included throughout the extraction and analytical process.

The analyses of the samples were conducted using a Thermo Scientific Vanquish ultra-high-pressure liquid chromatography coupled to a TSQ Quantis triple quadrupole mass spectrometer (UHPLC-MS). Chromatographic separation was achieved using a Gemini C18 (100×2 mm; 3 μm) column from Phenomenex. Water [A] and methanol [B] both containing 5 mM of ammonium acetate were used as the mobile phase. Optima grade water, methanol and ammonium acetate used in this study were purchased from Fisher Scientific. The gradient elution was set as 0-3 min 10% B, 3-4.5 min 10-35% B, 4.5-12.5 min 35-95% B, 12.5-12.51 min 95-99% B, 12.51-19 min 99% and then equilibrated to initial conditions in 30 min. The autosampler temperature was 4° C., the flow rate and injection volume were 0.5 mL min-1 and 10 μL, respectively. Each PFAS (native and/or mass-labeled) was detected using scheduled selected reaction monitoring scan (SRM) mode (monitoring two transitions, if possible). Additional LC-MS/MS analytical conditions are detailed in Table S2 (SI) and the scan parameters for all target analytes are found in Table S3 (SI).

PFAS Extraction Efficiency and Quantification Experiment

Figure 7:
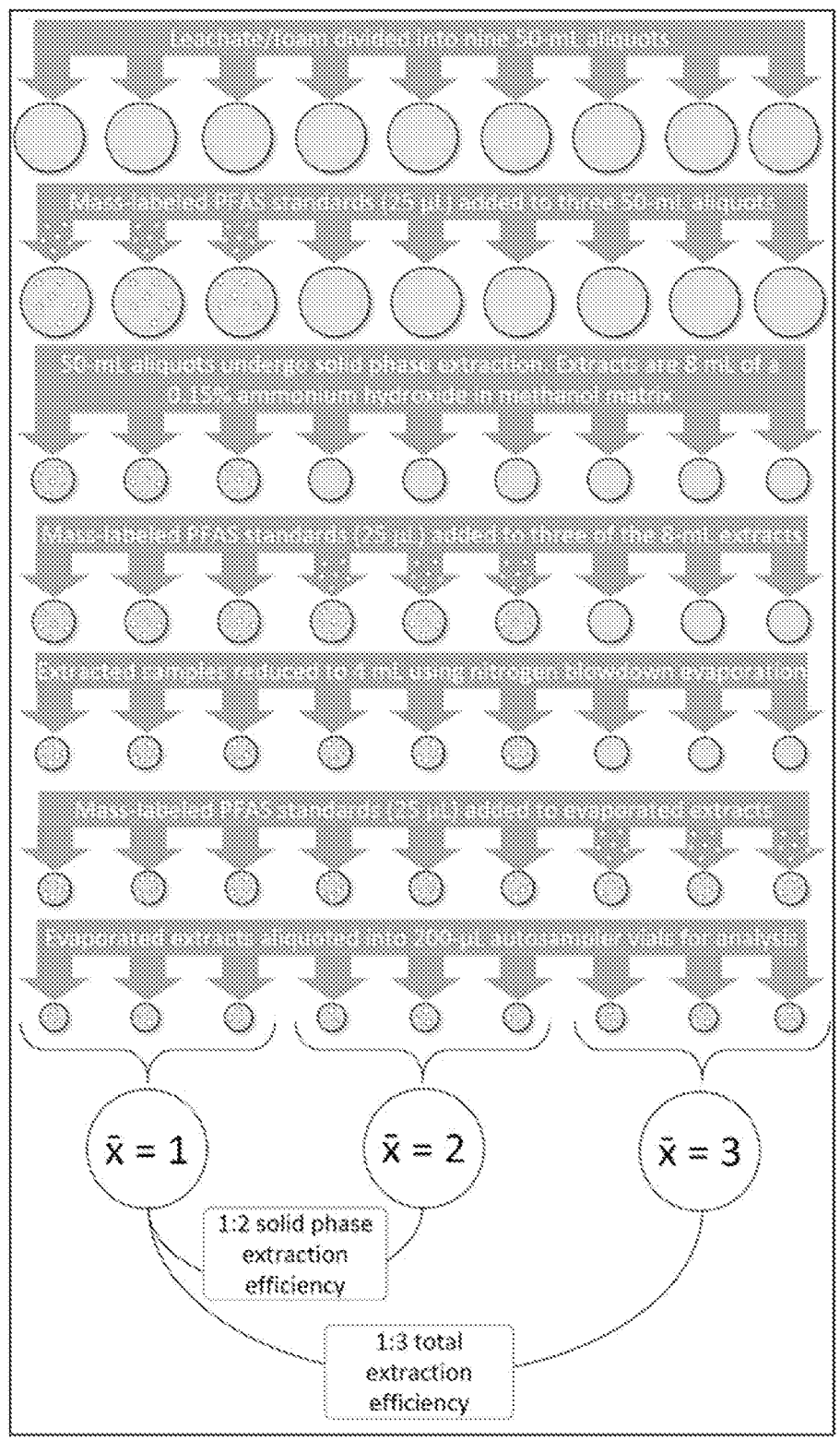
FIG. 7 illustrates extraction efficiency experiment details.

Because mass-labeled internal standards were added as "tracers" in the foam treatment study, quantification of PFAS compounds in those samples was not possible. Thus, nine additional 50-mL samples of leachate were collected from the 20-L carboy for a quantification and extraction efficiency experiment where mass-labeled PFAS internal standards (IS) were added to three 50-mL leachate samples before solid phase extraction (samples 1-3), three samples where IS was added after extraction but before evaporation (samples 4-6) and three samples where IS was added after evaporation down to 4 mL (samples 7-9). Approximately 3,000 mL of leachate was then added to a 5,000-mL glass beaker and aerated to produce approximately 500 mL of coalesced foam, which was then divided into nine-50 mL HDPE bottles for a similar foam concentration and extraction efficiency experiment (as described above for leachate). FIG. 1 describes the extraction efficiency experiment and details of the solid phase extraction and evaporation protocol are included in the "Extraction and LC-MS/MS Analysis" section. A more detailed diagram of the extraction efficiency experiment is included in FIG. 7. PFAS concentrations were calculated for three leachate and three foam aliquots (samples 1-3). For extraction efficiency calculations, the ratios between the mass-adjusted peak areas (peak area per gram of leachate) of the mass-labeled PFAS compounds were compared between the samples where IS was added before any extraction (samples 1-3), after solid phase extraction (samples 4-6) and after evaporation (samples 7-9). Results were compared between foam and leachate aliquots using a paired two-sample t-test to determine if there is a statistically significant difference in extraction efficiency.

For quantification, a calibration curve (14 levels, spanning from 10 ng/L to 100,000 ng/L) was developed for all 51 PFAS compounds (listed in Supplemental Table S4) through serial gravimetrically-weighed dilutions of primary standard solutions. Calibration information for each PFAS was derived and tailored using the prepared calibration levels. Each calibration level also contained a mixture of 24 mass-labeled PFAS internal standards (see Supplemental Table S1) at a concentration of ~1000 ng/L). The mass of all reagents and standards was recorded to report the most precise concentration. All mass-labeled PFAS compounds found in the mixtures and their respective gravimetric concentrations are detailed in Table S1 (SI). All PFAS standards were purchased from Wellington Laboratories Inc. (Guelph, ON, Canada).

Data Analysis

Scheduled selected-reaction monitoring (SRM) transitions were used to detect and quantify PFAS in a total of 56 samples and seven controls. The most intense transition was used to quantify PFAS while the second transition was used to confirm identification (if possible). Acquisition and peak integration were performed using Xcalibur v.4.1 (Thermo Fisher Scientific). PFAS were quantified in three leachate and three foam samples following integration of the peak area for the most intense transition of each analyte. A linear regression model was used to build the calibration curves, with intercept, slope and correlation coefficient values calculated over the linear dynamic range for each PFAS species. Instrument detection and quantification limits (LOD and LOQ, respectively) were calculated for each compound using calibration curve and visual signal-to-noise (S/N) determination (S/N of 3 and 10 for LOD and LOQ, respectively). Detection limits were also calculated using the method described by U.S. EPA 53, however, for most compounds, the visual method produced a higher (i.e., more conservative) LOD, and 7-replicates of each limit showed higher reproducibility (RSD<15%) than the EPA approach, so the visual method was employed in this study. LOD and LOQ for all 51 compounds are included in the supplemental Table S4. For the foam experiment, we examined the intra-sample variations between leachate before and after foaming and the coalesced foam for individual replicates. Each native and mass-labeled PFAS had a percent removed calculation (i.e., percent difference between the peak area of the "pre-foam" leachate aliquot and the "defoamed" leachate aliquot) as well as a concentration factor calculation (i.e., the ratio of the foam peak area to the defoamed leachate peak area). All peak areas were normalized to the mass of sample extracted e.g., peak area g−1.

Results and Discussion

Leachate Foaming Experiment

Figure 2:
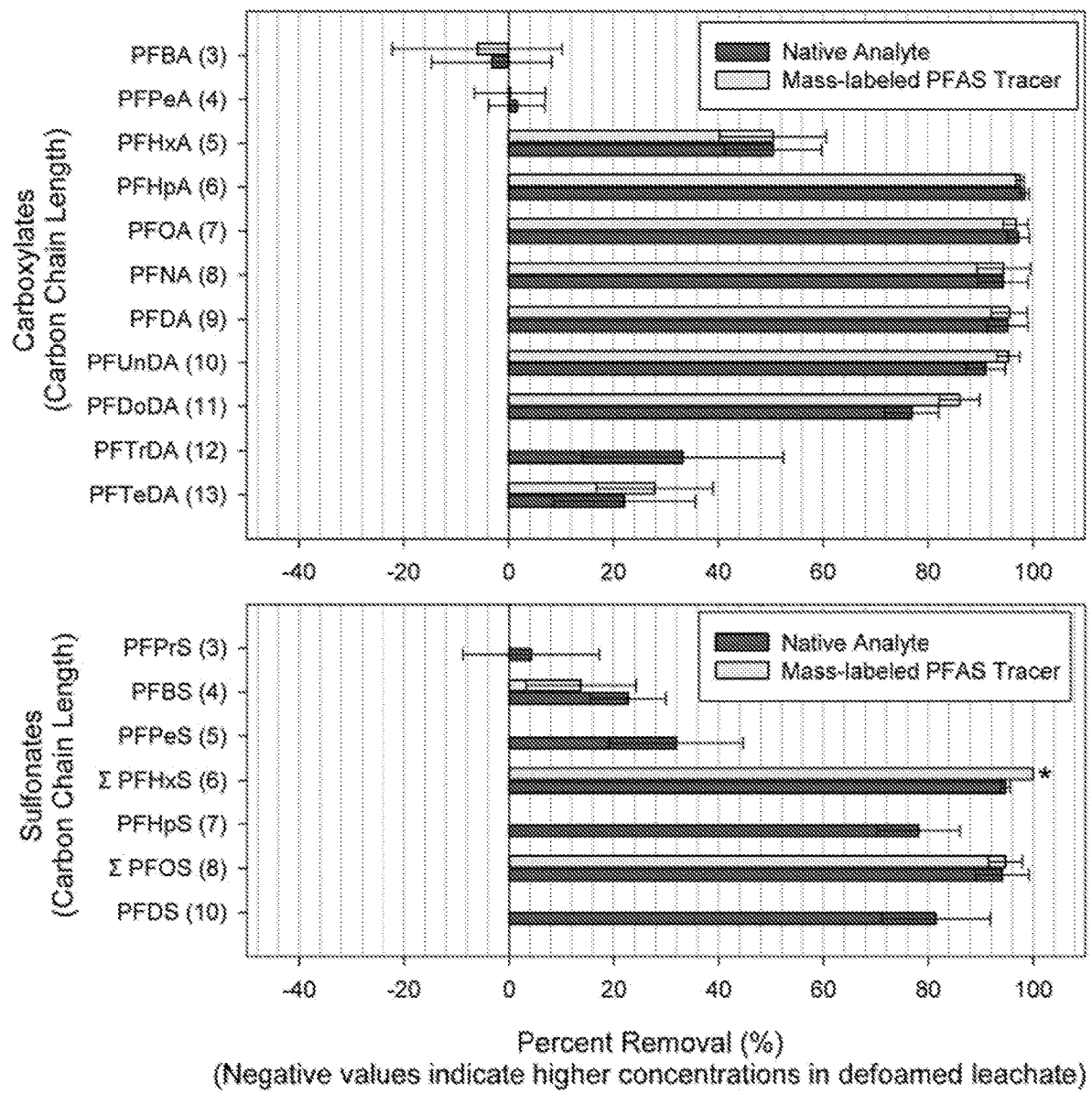
FIG. 2 illustrates graphs describing mean removal percentages for PFAS. Error bars represent standard deviation. In all ten foaming experiments, the mass-labeled tracer of PFHxS (*) was not found in defoamed leachate, therefore the removal percentage was assumed to be 100% (0% standard deviation). Σ PFOS and Σ PFHxS are shown as the sum of their respective isomers.
Figure 3:
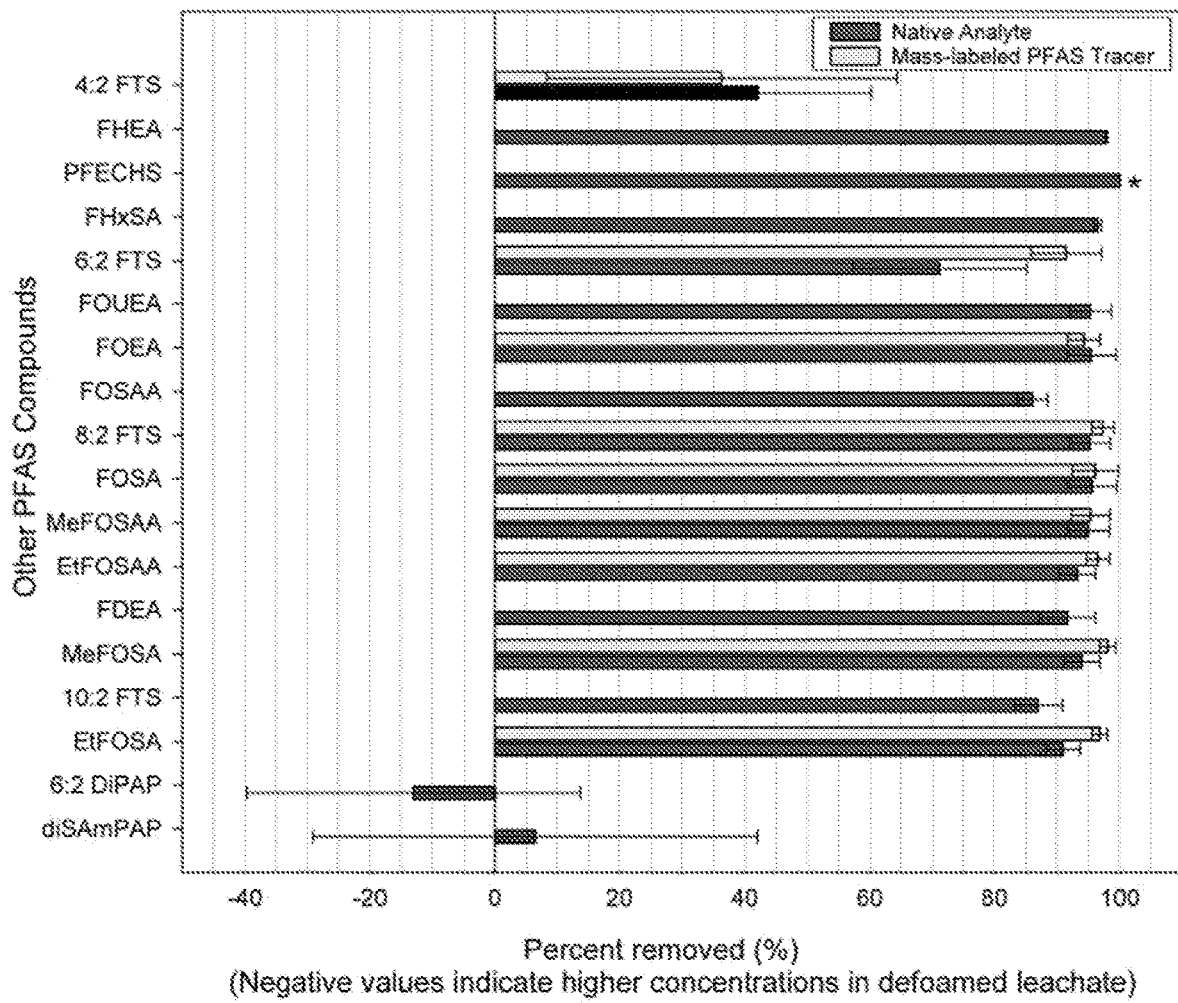
FIG. 3 illustrates graphs describing mean removal percentages for the remaining PFAS (a category which includes fluorotelomers and sulfonamides). Error bars represent standard deviation. In all ten foaming experiments, the labeled standard of PFECHS (*) was not found in defoamed leachate, therefore the removal percentage was assumed to be 100% (0% standard deviation). Compounds are displayed from top to bottom in increasing order of MS retention time.

The results of this study suggest that foam sequestration is an effective technique for concentrating several PFAS compounds in landfill leachate. The average amount of foam produced among the ten replicate experiments was 153 mL of foam from 700 mL of leachate, approximately 22% of the initial volume. The percent removal was calculated for 21 mass-labeled and 37 native compounds measured above detection limits. The effectiveness of the foaming technique for concentrating PFAS varied by compound, with a mean removal percentage of 69% and a median removal percentage of 92% among the ten foaming experiments (FIGS. 2 and 3). These removal rates, in a matrix which is likely more organically complex than the wastewaters used in other studies (23), are comparable to other foam removal studies, such as Meng et al. (41) and Ebersbach et al. (42). Results for native analytes and their corresponding mass-labeled compound were similar in most cases. The mean and median difference between the percent removal of native and mass-labeled compounds were 3.8% and 2.4%, respectively, and the difference was greater than 10% for only one compound, 6:2 FTS (FIGS. 2 and 3).

The percent of each compound removed can be found in FIGS. 2 (carboxylate and sulfonate PFAS compounds) and 3 (all other PFAS compounds measured above LOD, including fluorotelomers, sulfonamides and others). In several cases, a compound was detected in the leachate and foam but not in the defoamed leachate. When this happened (for native compounds PFHxS, FHEA, FHxSA, FOUEA, FOSAA, 8:2 FTS, FDEA and EtFOSA, and mass-labeled tracers 4:2 FTS, PFHpA, PFOS, FOEA, 8:2 FTS and FOSA), the average peak area of the other replicates was used instead. This results in a more conservative estimate than using a value of zero which would result in 100% compound removal for those replicates. Two compounds, PFECHS and the mass-labeled PFHxS tracer, were not found in any of the defoamed leachate samples, although they were found in all leachate and foam samples, so the percent removal was designated as 100%. PFHpS and 6:2 diPAP were not found in several leachate and defoamed samples but were found in the foam for all replicates, so the measured peak areas for leachate and defoamed samples for the remaining replicates were averaged to provide a substitute value and allow for an estimation of percent removal.

Two compounds, PFBA (a PFCA with carbon chain length of three) and 6:2 diPAP (a high molecular weight phosphate ester) were found, on average, in slightly higher concentrations in the defoamed leachate than in leachate, resulting in negative percent removal. However, in all of these cases, the value was close to zero with high variability (i.e., positive removal percentage was within one standard deviation). These compounds, as well as others with low, positive removal percentages (e.g., low molecular weight PFPeA (n=4) and PFPrS (n=3), and high molecular weight diSAmPAP) represented the lowest and highest molecular weight compounds, and showed some of the highest variability in removal percentage among all compounds. These compounds should be prioritized in future optimization studies; for example, Ebersbach et al. were able to increase removal of PFBS using lower air flow rates and longer treatment times (up to 120 min) 42 and Meng et al. reported improved removal of PFOS at higher ionic strengths and higher and lower adjusted pH (41).

Partitioning Behavior of PFAS into Foam

Figure 4:
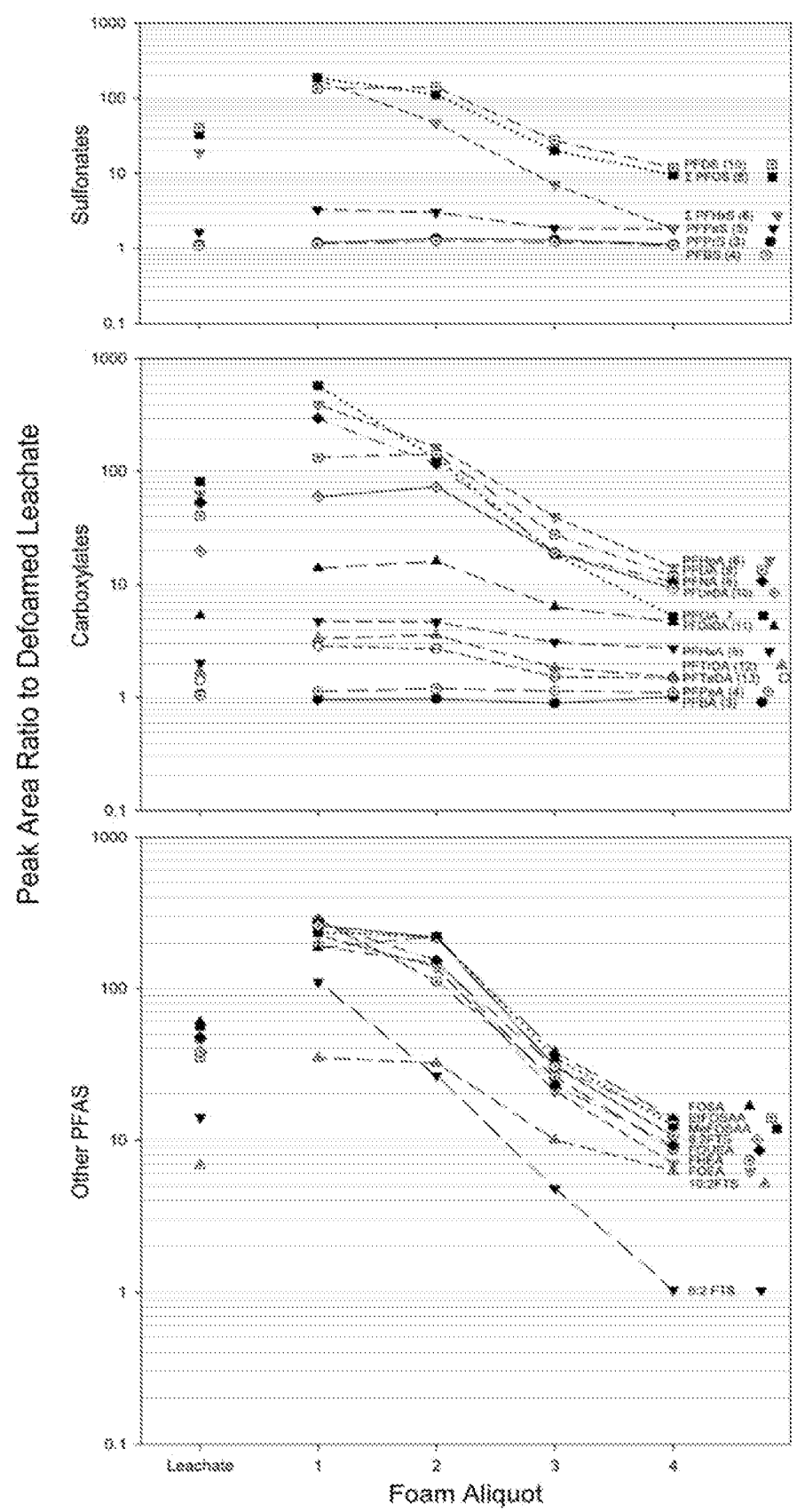
FIG. 4 illustrates graphs describing sequential foam experiment results for select PFAS compounds: all detected sulfonates and carboxylates and the nine most prevalent (by peak area) "other" PFAS compounds. Peak area ratios were calculated using the mean peak areas of native and mass-labeled PFAS compounds in leachate, in 50-mL aliquots (approximately 14% of the initial leachate volume) of coalesced foam and in defoamed leachate from three experiments. The values reported in the figure are the peak area of the sample divided by the peak area of the defoamed leachate (the end point of PFAS reduction for this experiment). Σ PFOS and Σ PFHxS are shown as the sum of their respective isomers.

For three of the ten foaming experiments, the collection of foam was modified to collect the foam sequentially into separate 50-mL aliquots to compare PFAS concentrations in the first foam collected versus subsequent 50-mL fractions. Thus, when foam was collected in these 50-mL aliquots, percent removal for each aliquot could not be determined in the same manner. The ratio between the defoamed leachate (i.e., the endpoint of these experiments) and each aliquot can illustrate the partitioning behavior as a function of foam removed and point towards an optimum fraction of leachate to remove as foam for PFAS removal and volume reduction. In this portion of the experiment, we derived the ratio between the peak areas for each compound found in the leachate (before foaming), then in each aliquot of coalesced foam, to the defoamed leachate. As shown in FIG. 4, the peak area ratio (a proxy for relative concentration) for some compounds is significantly higher in the first and second aliquots than in the third and fourth. These highest concentration aliquots combined account for approximately the first 100 mL of coalesced foam, or 14% of the initial leachate volume (100 mL of coalesced foam divided into 700 mL initial leachate volume). Compounds with low or negative removal percentages (e.g., PFBS, PFPrS, PFBA, PFPeA, 6:2 diPAP and diSAmPAP) in FIGS. 2 and 3 showed little or no change across any of the aliquots. These compounds partition to the foam to some extent, but not preferentially compared to water (leachate) partitioning.

Foam Sequestration Effectiveness as a Function of PFAS Structure

Figure 5:
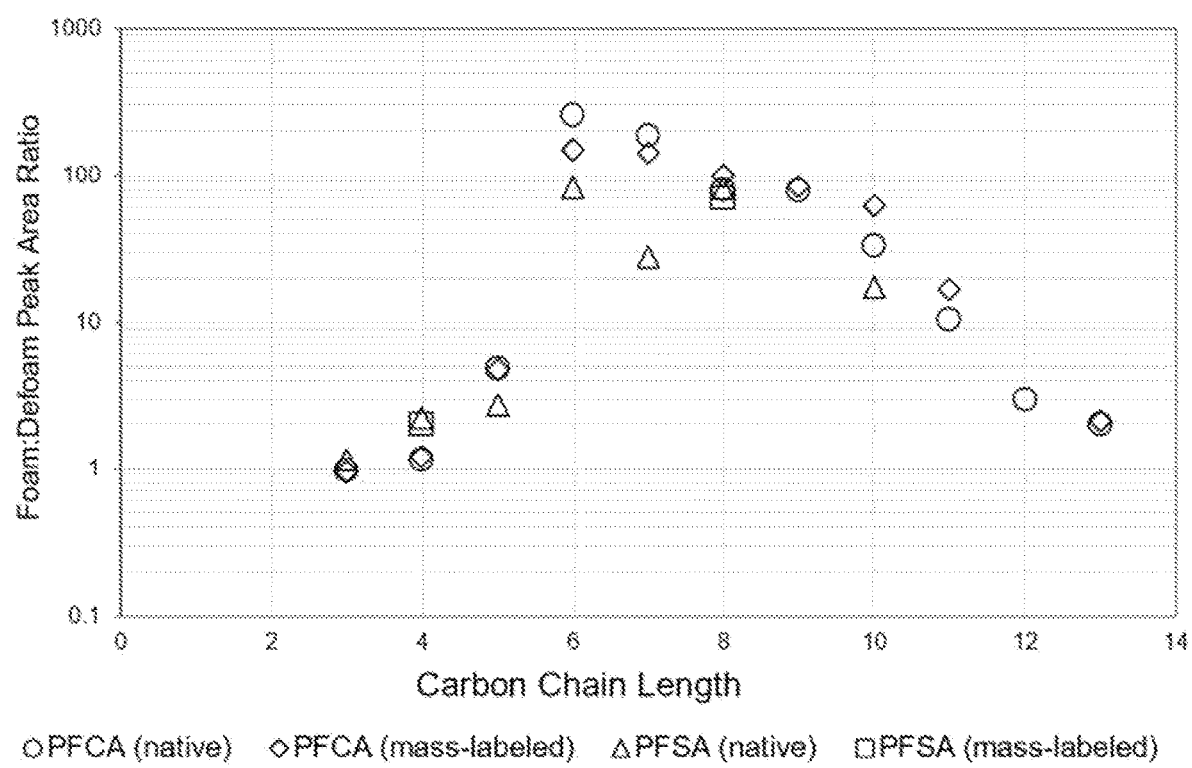
FIG. 5 illustrates graphs describing average foam:defoam peak area ratio among perfluoroalkyl acids (PFAA) relative to carbon chain length.

Goss et al. (47) and Campbell et al. (45) compared air-water interface partitioning coefficients for select PFAS compounds (fluorotelomer alcohols/olefins and perfluoroalkyl acids (PFAA), respectively) and in both cases, found a positive relationship between the number of carbons in the compounds' carbon-fluorine chains and interfacial partitioning. Using foam removal of PFAAs, Ebersbach et al. also reported an increase in elimination rate as the carbon chain length increased (42). The results of this experiment suggest a similar trend for short-chain PFAS, which reverses among longer chain species. Sequestration peaks for the carboxylates at PFHpA (carbon chain=6) and for the sulfonates at PFOS (carbon chain=8), and the ratio declines for all longer-chain compounds, although the shortest chain species (PFBA, PFPrS, n=3; and PFPeA and PFBS, n=4) remain the lowest in terms of relative concentration in the foam. FIG. 5 compares the foam:defoam peak area ratio for PFAS of different carbon chain lengths, and the same trend is demonstrated in FIGS. 2, 3 and 4—more effective foam sequestration, whether measured as the percent removed from leachate or the relative abundance in foam, as molecular weight increases within each PFAS class, to a point, then less effective among the largest compounds. Variability, measured as standard deviation among ten replicated experiments, was highest among the lowest and highest molecular weight compounds as well. This could suggest instability of the compound or a matrix interference, and this experiment was not performed to account for PFAS transformations within the leachate (e.g., due to aeration) or transportation of aerosols outside of the experimental setup (14,42).

PFAS Extraction Efficiency and Quantification Experiment

Figure 6:
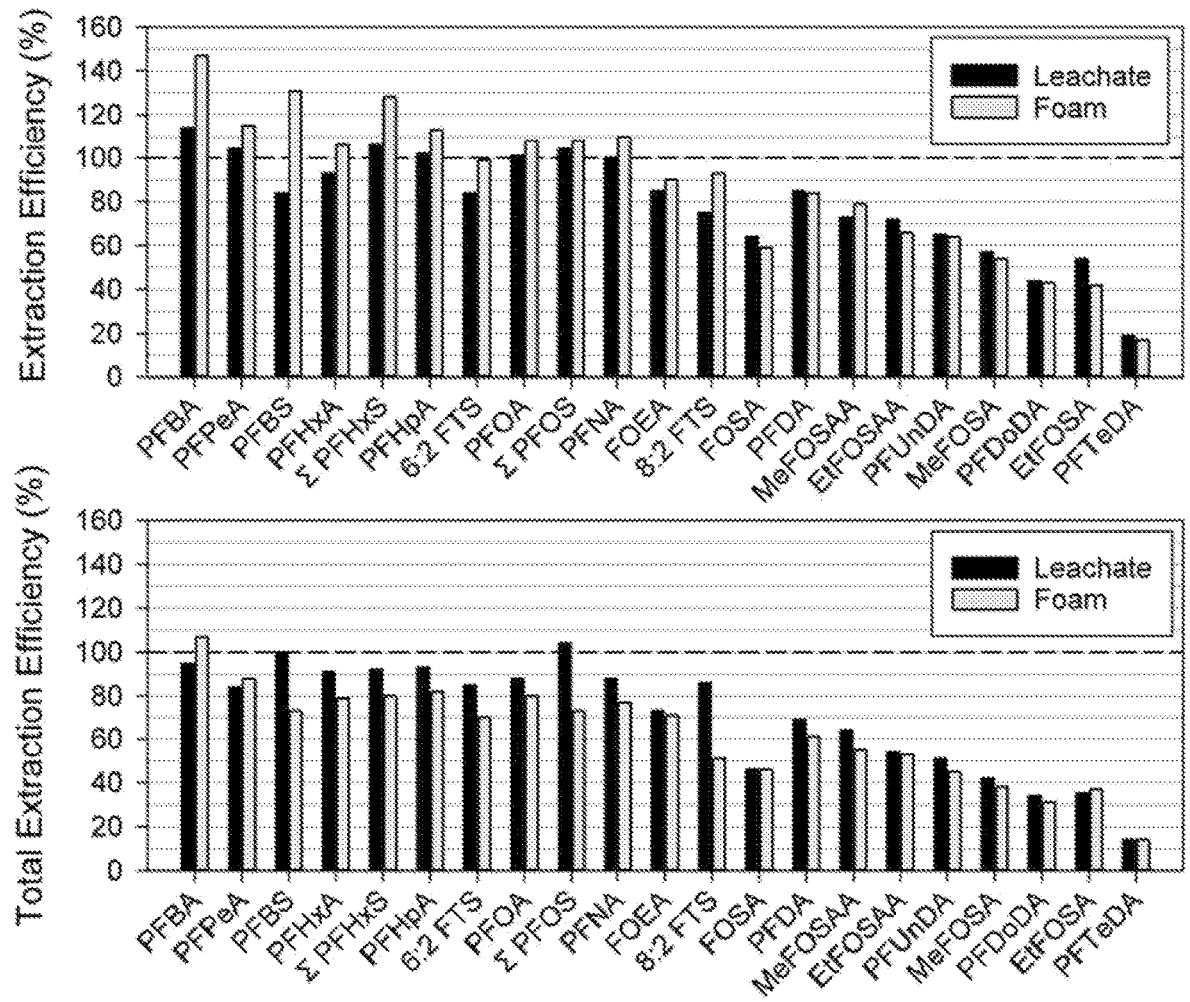
FIG. 6 illustrates graphs describing extraction efficiency comparison for solid phase extraction and total extraction (i.e., after nitrogen evaporation) for leachate and foam. Σ PFOS and Σ PFHxS are shown as the sum of their respective isomers. Compounds are shown in increasing order of retention time.

Solid phase (comparing samples 1-3 to samples 4-6) and total preparation (comparing samples 1-3 to samples 7-9, as described in Methods) efficiencies for the 22 mass-labeled PFAS are presented in FIG. 6. Mass-labeled PFAS standards of the 22 compounds listed in Table S1 (SI) were used, although one, 4:2 FTS (a fluorotelomer), was unable to be detected at the concentrations used in the standard. Total preparation efficiency was between 70% and 130% for 11 and 12 of the 21 compounds for leachate and foam, respectively. Extraction efficiency was lowest for the largest molecular weight compounds, particularly PFTeDA at less than 20% for both matrices and both extraction endpoints. Where SPE efficiency of PFTeDA in landfill leachate has been reported elsewhere, results ranged between 8% 54 and 155% 55. Additional comparison between these extraction efficiency results and selections from the literature can be found in Table S6 (SI). The paired sample t-test results suggest a significant difference between extraction efficiencies (for both solid phase extraction and total extraction) between leachate and foam ($\alpha$=0.05). On average across all 21 compounds, foam extraction efficiency was 8% higher than leachate extraction efficiency for both solid phase and total extraction. Perhaps, constituents found in the leachate matrix which interfere with PFAS extraction do not partition to the foam, making coalesced foam a "cleaner" matrix for extraction; this hypothesis would necessitate a follow-up study to confirm. The average loss during evaporation (i.e., the difference between extraction efficiency of solid phase extraction and total extraction efficiency) is 18% for both leachate and foam. Despite these losses, the nitrogen evaporation process is an important part of extraction in order to concentrate the sample and improve quantification of trace species. A thorough evaluation of PFAS loss during evaporation versus improved mass spectrometric response for low-concentration compounds has yet to be published. The differences between leachate and foam extraction efficiencies and evaporation loss for individual compounds is included in Table S5 (SI).

Of the 51 native PFAS measured in the quantification experiment, 32 and 36 were present in leachate and foam, respectively, at levels above the detection limit. Landfill leachate is notoriously heterogeneous, with a diversity of PFAS, wide concentration ranges and high standard deviations of concentrations reported in the literature (29,34). Based on what has been published previously, the PFAS concentrations determined from the leachate samples used in this study align with what is typical for MSW landfill leachate. Mean concentrations and standard deviations for each PFAS detected at concentrations above the detection limits, in both the foam and leachate are included in Table 1. Two compounds, 6:2 FTS and 6:2 diPAP, were measured in every field and control blank, so the average peak area of the blanks was subtracted from the samples.

TABLE 1

Mean PFAS concentrations and standard deviation in leachate and coalesced foam. A complete list of the compounds included in this study, as well as full names and classification details is found in Table S4 of the Supplemental Information.

| | Mean Concentration (Standard Deviation) | |
|---|---|---|
| Compound | Leachate (ng/L) n = 3 | Foam (ng/L) n = 3 |
| PFBA | +1,021.4 (437.6) | 660.5 (200.2) |
| PFPeA | 837.1 (118.5) | 930.2 (111.4) |
| PFHxA | +2,178.6 (16.2) | +7987.7 (259.5) |
| PFHpA | 454.1 (13.1) | +3034.3 (112.1) |
| PFOA | 950.9 (58.1) | +5,659.4 (151.9) |
| PFNA | 63.8 (2.1) | 272.3 (7.5) |
| PFDA | 86.9 (4.2) | 249.7 (40.7) |
| PFUnDA | 11.5 (0.9) | 28.2 (5.0) |
| PFDoDA | 11.2 (1.5) | 29.4 (1.9) |
| PFTrDA | BDL | 2.4 (0.2) |
| PFTeDA | *0.9 (0.2) | *1.5 (0.2) |
| PFPrS | 10.8 (1.7) | 12 (3.3) |
| PFBS | +752.6 (119.7) | +1,806.1 (116.6) |
| PFPeS | 24.6 (4.5) | +62.5 (1.4) |
| Σ PFHxS | 2,058.9 (280) | +10,630.3 (583.9) |
| PFHpS | BDL | *2.9 (0.7) |
| Σ PFOS | 103.9 (13.6) | 199.7 (5.6) |
| PFDS | BDL | *2.6 (0.5) |
| 4:2 FTS | BDL | 4.3 (0.8) |
| 6:2 FTS | +134.7 (29.1) | +820.7 (146.3) |
| 8:2 FTS | 22.8 (2.1) | +32.4 (11.8) |
| 10:2 FTS | 6.2 (0.1) | 31.6 (2.2) |
| FHEA | 329.4 (8.5) | +1,799.5 (72.3) |
| FOEA | 131.9 (10.7) | 377.6 (71.4) |
| FDEA | *11.5 (0.8) | 57.3 (14.4) |
| FOUEA | 5.9 (0.9) | +16.1 (3.6) |
| PFECHS | *0.4 (0.1) | 3.1 (0.4) |
| FHxSA | *2.1 (0.7) | 5.8 (0.3) |
| FOSA | 7.6 (0.9) | 17.4 (2.6) |
| FOSAA | 3.4 (0.2) | 5.5 (0.4) |
| MeFOSAA | 111.5 (16.1) | 269.9 (45.9) |

TABLE 1-continued

Mean PFAS concentrations and standard deviation in leachate and coalesced foam. A complete list of the compounds included in this study, as well as full names and classification details is found in Table S4 of the Supplemental Information.

| Compound | Mean Concentration (Standard Deviation) | |
|---|---|---|
|  | Leachate (ng/L) n = 3 | Foam (ng/L) n = 3 |
| EtFOSAA | 85.5 (4.2) | 180.1 (35.3) |
| MeFOSA | *0.7 (0) | *1.3 (0.1) |
| EtFOSA | 6.2 (0.7) | 11.9 (2.6) |
| 6:2 diPAP | 4.2 (0.3) | 3.6 (0.3) |
| diSAmPAP | 4.3 (1.8) | +8.5 (3.9) |

BDL indicates compounds for which the peak area was below the instrument detection limits
*compounds found above detection limits but below the limit of quantification (LOQ) in at least one of the three samples
+denotes concentrations above the highest point of the calibration curve.

Implications

The experimental results presented here have implications for the analysis of PFAS in water as well as wastewater treatment applications. This foam generation and collection technique can be used to concentrate several PFAS within a matrix (in this case, landfill leachate), which can enhance PFAS measurement in complex matrices, particularly species of interest which occur in low concentrations. With respect to engineering applications, the results suggest that the separation of PFAS chemicals into a volume-reduced, highly concentrated, coalesced foam may prove a valuable addition to leachate treatment strategies at MSW landfills. A common practice at landfills sites is aeration of leachate in lagoons or similar storage units, typically using surface aerators. Occasionally, operators will include a dissolved air flotation unit, which by their nature include removal of a foam fraction. The process described herein is simple and could feasibly be applied at a relatively low cost at most landfills, even in discrete locations within a landfill site, optimized to address specific leachate streams.

A majority of the dominant PFAS species detected in a typical active MSW landfill leachate were removed at levels well over 80%. This includes the two PFAS species with EPA-recommended exposure guidances, PFOS and PFOA. If we apply the mean percent removal from the foam experiment to the initial concentrations of these compounds, the defoamed leachates would contain 26.3 ng L−1 PFOA and 3.4 ng L−1 PFOS, well below the EPA drinking water guidance and FDEP GCTL threshold of 70 ng L−1 combined. Low molecular weight compound PFBA was one of the most highly concentrated compounds in this leachate and did not respond to foam separation. This low response has been reported for other sequestration methods, such as granular activated carbon39. It is possible that a modification of this experiment, for instance pH adjustment, may change the partitioning behavior of highly mobile species.

Additional research is required to optimize foaming strategies that both maximize PFAS concentration (particularly for PFAS which did not partition to the foam under the conditions of this study) and minimize foam volume (as sequential foam collection found that the highest rate of removal occurs in the initial generation of foam, approximately the first 14% of leachate removed). While PFTeDA exhibited the lowest extraction efficiency and poor foam partitioning, other PFAS with low recoveries (e.g., FOSA, MeFOSA, PFDoDA, EtFOSA) had high foam partitioning and thus would be good candidates for foam-augmented analysis. Partitioning tendencies of most precursor species and some of the less common PFAAs are not well understood, and more research may shed light on the behavior of these compounds in this experiment. Strategies for managing concentrated leachate streams (to align with the foaming approach) require further investigation, whether they be destructive technologies such as plasma, sonication, or chemical oxidation, or stabilization techniques that will allow the material to be disposed of in the landfill in a manner such that PFAS is not released back into the leachate.

REFERENCES (1) Daly, E. R.; Chan, B. P.; Talbot, E. A.; Nassif, J.; Bean, C.; Cavallo, S. J.; Metcalf, E.; Simone, K.; Woolf, A. D. Per- and Polyfluoroalkyl Substance (PFAS) Exposure Assessment in a Community Exposed to Contaminated Drinking Water, New Hampshire, 2015. International Journal of Hygiene and Environmental Health 2018, 221 (3), 569-577. https://doi.org/10.1016/j.ijheh.2018.02.007.

(2) Hogue, C. Short-chain and long-chain PFAS show similar toxicity, US National Toxicology Program says https://cen.acs.org/environment/persistent-pollutants/Short-chain-long-chain-PFAS/97/i33 (accessed Sep. 28, 2019).

(3) McCarthy, C.; Kappleman, W.; DiGuiseppi, W. Ecological Considerations of Per- and Polyfluoroalkyl Substances (PFAS). Curr Pollution Rep 2017, 3 (4), 289-301. https://doi.org/10.1007/s40726-017-0070-8.

(4) Wang, Z.; Cousins, I. T.; Scheringer, M.; Hungerbuehler, K. Hazard Assessment of Fluorinated Alternatives to Long-Chain Perfluoroalkyl Acids (PFAAs) and Their Precursors: Status Quo, Ongoing Challenges and Possible Solutions. Environment International 2015, 75, 172-179. https://doi.org/10.1016/j.envint.2014.11.013.

(5) Calafat, A. M.; Wong, L.-Y.; Kuklenyik, Z.; Reidy, J. A.; Needham, L. L. Polyfluoroalkyl Chemicals in the U.S. Population: Data from the National Health and Nutrition Examination Survey (NHANES) 2003-2004 and Comparisons with NHANES 1999-2000. Environmental Health Perspectives 2007, 115 (11), 1596-1602. https://doi.org/10.1289/ehp.10598.

(6) Munoz, G.; Labadie, P.; Botta, F.; Lestremau, F.; Lopez, B.; Geneste, E.; Pardon, P.; Dévier, M.-H.; Budzinski, H. Occurrence Survey and Spatial Distribution of Perfluoroalkyl and Polyfluoroalkyl Surfactants in Groundwater, Surface Water, and Sediments from Tropical Environments. Science of The Total Environment 2017, 607-608, 243-252. https://doi.org/10.1016/j.scitotenv.2017.06.146.

(7) Pan, C.-G.; Ying, G.-G.; Liu, Y.-S.; Zhang, Q.-Q.; Chen, Z.-F.; Peng, F.-J.; Huang, G.-Y. Contamination Profiles of Perfluoroalkyl Substances in Five Typical Rivers of the Pearl River Delta Region, South China. Chemosphere 2014, 114, 16-25. https://doi.org/10.1016/j.chemosphere.2014.04.005.

(8) Houtz, E. F.; Higgins, C. P.; Field, J. A.; Sedlak, D. L. Persistence of Perfluoroalkyl Acid Precursors in AFFF-Impacted Groundwater and Soil. Environ. Sci. Technol. 2013, 47 (15), 8187-8195. https://doi.org/10.1021/es4018877.

(9) Sáez, M.; de Voogt, P.; Parsons, J. R. Persistence of Perfluoroalkylated Substances in Closed Bottle Tests with Municipal Sewage Sludge. Environ Sci Pollut Res 2008, 15 (6), 472-477. https://doi.org/10.1007/s11356-008-0020-5.

(10) Washington, J. W.; Yoo, H.; Ellington, J. J.; Jenkins, T. M.; Libelo, E. L. Concentrations, Distribution, and Persistence of Perfluoroalkylates in Sludge-Applied Soils near Decatur, Alabama, USA. Environ. Sci. Technol. 2010, 44 (22), 8390-8396. https://doi.org/10.1021/es1003846.
(11) Hamid, H.; Li, L. Y.; Grace, J. R. Review of the Fate and Transformation of Per- and Polyfluoroalkyl Substances (PFASs) in Landfills. Environmental Pollution 2018, 235, 74-84. https://doi.org/10.1016/j.envpol.2017.12.030.
(12) Kwok, K. Y.; Yamazaki, E.; Yamashita, N.; Taniyasu, S.; Murphy, M. B.; Horii, Y.; Petrick, G.; Kallerborn, R.; Kannan, K.; Murano, K.; Lam, P. K. S. Transport of Perfluoroalkyl Substances (PFAS) from an Arctic Glacier to Downstream Locations: Implications for Sources. Science of The Total Environment 2013, 447, 46-55. https://doi.org/10.1016/j.scitotenv.2012.10.091.
(13) Möller, A.; Ahrens, L.; Surm, R.; Westerveld, J.; van der Wielen, F.; Ebinghaus, R.; de Voogt, P. Distribution and Sources of Polyfluoroalkyl Substances (PFAS) in the River Rhine Watershed. Environmental Pollution 2010, 158 (10), 3243-3250. https://doi.org/10.1016/j.envpol.2010.07.019.
(14) H. Johansson, J.; Shi, Y.; Salter, M.; T. Cousins, I. Spatial Variation in the Atmospheric Deposition of Perfluoroalkyl Acids: Source Elucidation through Analysis of Isomer Patterns. Environmental Science: Processes & Impacts 2018, 20 (7), 997-1006. https://doi.org/10.1039/C8EM00102B.
(15) Ahrens, L.; Shoeib, M.; Harner, T.; Lee, S. C.; Guo, R.; Reiner, E. J. Wastewater Treatment Plant and Landfills as Sources of Polyfluoroalkyl Compounds to the Atmosphere †. Environ. Sci. Technol. 2011, 45 (19), 8098-8105. https://doi.org/10.1021/es1036173.
(16) Gallen, C.; Eaglesham, G.; Drage, D.; Nguyen, T. H.; Mueller, J. F. A Mass Estimate of Perfluoroalkyl Substance (PFAS) Release from Australian Wastewater Treatment Plants. Chemosphere 2018, 208, 975-983. https://doi.org/10.1016/j.chemosphere.2018.06.024.
(17) Hamid, H.; Li, L. Role of Wastewater Treatment Plant in Environmental Cycling of Poly- and Perfluoroalkyl Substances. Ecocycles 2016, 2 (2), 43-53. https://doi.org/10.19040/ecocycles.v2i2.62.
(18) Loganathan, B. G.; Sajwan, K. S.; Sinclair, E.; Senthil Kumar, K.; Kannan, K. Perfluoroalkyl Sulfonates and Perfluorocarboxylates in Two Wastewater Treatment Facilities in Kentucky and Georgia. Water Research 2007, 41 (20), 4611-4620. https://doi.org/10.1016/j.watres.2007.06.045.
(19) Schultz, M. M.; Higgins, C. P.; Huset, C. A.; Luthy, R. G.; Barofsky, D. F.; Field, J. A. Fluorochemical Mass Flows in a Municipal Wastewater Treatment Facility. Environ. Sci. Technol. 2006, 40 (23), 7350-7357. https://doi.org/10.1021/es061025m.
(20) Sinclair, E.; Kannan, K. Mass Loading and Fate of Perfluoroalkyl Surfactants in Wastewater Treatment Plants. Environ. Sci. Technol. 2006, 40 (5), 1408-1414. https://doi.org/10.1021/es051798v.
(21) U.S. EPA. RCRA Subtitle D (40 CFR § 258.40) Criteria for Municipal Solid Waste Landfills: Design Criteria; 2012.
(22) Maliva, R. G.; Walker, C. W. Hydrogeology of Deep-Well Disposal of Liquid Wastes in Southwestern Florida, USA. Hydrogeology Journal 1998, 6 (4), 538-548. https://doi.org/10.1007/s100400050174.
(23) Martin, K.; Cooper, W. J.; Heyes, A.; Ma, S.; Powers, L.; Robey, N. M.; Schmitt-Kopplin, P.; Townsend, T. G.; Gonsior, M. A Characterization of Landfill Leachate Molecular Composition Using Ultrahigh Resolution Mass Spectrometry. Environmental Science and Technology In Review.
(24) Moody, C. M.; Townsend, T. G. A Comparison of Landfill Leachates Based on Waste Composition. Waste Management 2017, 63 (Journal Article), 267-274. https://doi.org/10.1016/j.wasman.2016.09.020.
(25) Haarstad, K.; Borch, H. Halogenated Compounds, PCB and Pesticides in Landfill Leachate, Downstream Lake Sediments and Fish. Journal of Environmental Science and Health, Part A 2008, 43 (12), 1346-1352. https://doi.org/10.1080/10934520802231966.
(26) Musson, S. E.; Townsend, T. G. Pharmaceutical Compound Content of Municipal Solid Waste. Journal of Hazardous Materials 2009, 162 (2-3), 730-735. https://doi.org/10.1016/j.jhazmat.2008.05.089.
(27) Benskin, J. P.; Li, B.; Ikonomou, M. G.; Grace, J. R.; Li, L. Y. Per- and Polyfluoroalkyl Substances in Landfill Leachate: Patterns, Time Trends, and Sources. Environ. Sci. Technol. 2012, 46 (21), 11532-11540. https://doi.org/10.1021/es302471n.
(28) Fuertes, I.; Gómez-Lavin, S.; Elizalde, M. P.; Urtiaga, A. Perfluorinated Alkyl Substances (PFASs) in Northern Spain Municipal Solid Waste Landfill Leachates. Chemosphere 2017, 168, 399-407. https://doi.org/10.1016/j.chemosphere.2016.10.072.
(29) Lang, J. R.; Allred, B. M.; Field, J. A.; Levis, J. W.; Barlaz, M. A. National Estimate of Per- and Polyfluoroalkyl Substance (PFAS) Release to U.S. Municipal Landfill Leachate. Environ. Sci. Technol. 2017, 51 (4), 2197-2205. https://doi.org/10.1021/acs.est.6b05005.
(30) Eggen, T.; Moeder, M.; Arukwe, A. Municipal Landfill Leachates: A Significant Source for New and Emerging Pollutants. Science of The Total Environment 2010, 408 (21), 5147-5157. https://doi.org/10.1016/j.scitotenv.2010.07.049.
(31) Masoner, J. R.; Kolpin, D. W.; Furlong, E. T.; Cozzarelli, I. M.; Gray, J. L. Landfill Leachate as a Mirror of Today's Disposable Society: Pharmaceuticals and Other Contaminants of Emerging Concern in Final Leachate from Landfills in the Conterminous United States: CECs in Final Leachate from Landfills in the USA. Environ Toxicol Chem 2016, 35 (4), 906-918. https://doi.org/10.1002/etc.3219.
(32) Slack, R. J.; Gronow, J. R.; Voulvoulis, N. Household Hazardous Waste in Municipal Landfills: Contaminants in Leachate. Science of The Total Environment 2005, 337 (1), 119-137. https://doi.org/10.1016/j.scitotenv.2004.07.002.
(33) Busch, J.; Ahrens, L.; Sturm, R.; Ebinghaus, R. Polyfluoroalkyl Compounds in Landfill Leachates. Environmental Pollution 2010, 158 (5), 1467-1471. https://doi.org/10.1016/j.envpol.2009.12.031.
(34) Gallen, C.; Drage, D.; Eaglesham, G.; Grant, S.; Bowman, M.; Mueller, J. F. Australia-Wide Assessment of Perfluoroalkyl Substances (PFASs) in Landfill Leachates. Journal of Hazardous Materials 2017, 331, 132-141. https://doi.org/10.1016/j.jhazmat.2017.02.006.
(35) U.S. EPA. Interim Recommendations to Address Groundwater Contaminated with Perfluorooctanoic Acid and Perfluorooctanesulfonate. OLEM Directive No. 9283.1-47, 2019.
(36) U.S. EPA. Drinking Water Health Advisories for PFOA and PFOS. FACT SHEET 2016, 5.
(37) Stuchal, L.; Roberts, S. PFAS—Provisional Cleanup Target Levels and Screening Levels, 2019.

(38) Solo-Gabriele, H. M.; Jones, A. S.; Lindstrom, A. B.; Lang, J. R. Waste Type, Incineration, and Aeration Are Associated with per- and Polyfluoroalkyl Levels in Landfill Leachates. Waste Management 2020, 107, 191-200.
(39) Ross, I.; McDonough, J.; Miles, J.; Storch, P.; Thelakkat Kochunarayanan, P.; Kalve, E.; Hurst, J.; S. Dasgupta, S.; Burdick, J. A Review of Emerging Technologies for Remediation of PFASs. Remediation 2018, 28 (2), 101-126. https://doi.org/10.1002/rem.21553.
(40) Wei, Z.; Xu, T.; Zhao, D. Treatment of Per- and Polyfluoroalkyl Substances in Landfill Leachate: Status, Chemistry and Prospects. Environmental Science: Water Research & Technology 2019, 5 (11), 1814-1835. https://doi.org/10.1039/C9EW00645A.
(41) Meng, P.; Deng, S.; Maimaiti, A.; Wang, B.; Huang, J.; Wang, Y.; Cousins, I. T.; Yu, G. Efficient Removal of Perfluorooctane Sulfonate from Aqueous Film-Forming Foam Solution by Aeration-Foam Collection. Chemosphere 2018, 203, 263-270. https://doi.org/10.1016/j.chemosphere.2018.03.183.
(42) Ebersbach, I.; Ludwig, S. M.; Constapel, M.; Kling, H.-W. An Alternative Treatment Method for Fluorosurfactant-Containing Wastewater by Aerosol-Mediated Separation. Water Research 2016, 101, 333-340. https://doi.org/10.1016/j.watres.2016.05.063.
(43) Brusseau, M. L. Assessing the Potential Contributions of Additional Retention Processes to PFAS Retardation in the Subsurface. Science of The Total Environment 2018, 613-614, 176-185. https://doi.org/10.1016/j.scitotenv.2017.09.065.
(44) Brusseau, M. L.; Yan, N.; Van Glubt, S.; Wang, Y.; Chen, W.; Lyu, Y.; Dungan, B.; Carroll, K. C.; Holguin, F. O. Comprehensive Retention Model for PFAS Transport in Subsurface Systems. Water Research 2019, 148, 41-50. https://doi.org/10.1016/j.watres.2018.10.035.
(45) Campbell, T. Y.; Vecitis, C. D.; Mader, B. T.; Hoffmann, M. R. Perfluorinated Surfactant Chain-Length Effects on Sonochemical Kinetics. J. Phys. Chem. A 2009, 113 (36), 9834-9842. https://doi.org/10.1021/jp903003w.
(46) Psillakis, E.; Cheng, J.; Hoffmann, M. R.; Colussi, A. J. Enrichment Factors of Perfluoroalkyl Oxoanions at the Air/Water Interface. The Journal of Physical Chemistry A 2009, No. 113, 8826-8829.
(47) Goss, K.-U.; Bronner, G.; Harner, T.; Hertel, M.; Schmidt, T. C. The Partition Behavior of Fluorotelomer Alcohols and Olefins. Environ. Sci. Technol. 2006, 40 (11), 3572-3577. https://doi.org/10.1021/es060004p.
(48) Wang, F.; Liu, C.; Shih, K. Adsorption Behavior of Perfluorooctanesulfonate (PFOS) and Perfluorooctanoate (PFOA) on Boehmite. Chemosphere 2012, 89 (8), 1009-1014. https://doi.org/10.1016/j.chemosphere.2012.06.071.
(49) Anderson, H. R.; Adamson, D. T.; Stroo, H. F. Partitioning of Poly- and Perfluoroalkyl Substances from Soil to Groundwater within Aqueous Film-Forming Foam Source Zones. Journal of Contaminant Hydrology 2019, 220, 59-65. https://doi.org/10.1016/j.jconhyd.2018.11.011.
(50) Barzen-Hanson, K. A.; Roberts, S. C.; Choyke, S.; Oetjen, K.; McAlees, A.; Riddell, N.; McCrindle, R.; Ferguson, P. L.; Higgins, C. P.; Field, J. A. Discovery of 40 Classes of Per- and Polyfluoroalkyl Substances in Historical Aqueous Film-Forming Foams (AFFFs) and AFFF-Impacted Groundwater. Environ. Sci. Technol. 2017, 51 (4), 2047-2057. https://doi.org/10.1021/acs.est.6b05843.
(51) Moody, C. A.; Hebert, G. N.; Strauss, S. H.; Field, J. A. Occurrence and Persistence of Perfluorooctanesulfonate and Other Perfluorinated Surfactants in Groundwater at a Fire-Training Area at Wurtsmith Air Force Base, Michigan, USA. Journal of Environmental Monitoring 2003, 5 (2), 341-345. https://doi.org/10.1039/B212497A.
(52) Appleman, T. D.; Higgins, C. P.; Quiñones, O.; Vanderford, B. J.; Kolstad, C.; Zeigler-Holady, J. C.; Dickenson, E. R. V. Treatment of Poly- and Perfluoroalkyl Substances in U.S. Full-Scale Water Treatment Systems. Water Research 2014, 51, 246-255. https://doi.org/10.1016/j.watres.2013.10.067.
(53) U.S. EPA. Definition and Procedure for the Determination of the MEthod Detection Limit, Revision 2—EPA 821-R-16-006. Office of Water, Washington, D.C. December 2016.
(54) Huset, C. A.; Barlaz, M. A.; Barofsky, D. F.; Field, J. A. Quantitative Determination of Fluorochemicals in Municipal Landfill Leachates. Chemosphere 2011, 82 (10), 1380-1386. https://doi.org/10.1016/j.chemosphere.2010.11.072.
(55) Benskin, J. P.; Ikonomou, M. G.; Woudneh, M. B.; Cosgrove, J. R. Rapid Characterization of Perfluoralkyl Carboxylate, Sulfonate, and Sulfonamide Isomers by High-Performance Liquid Chromatography-Tandem Mass Spectrometry. Journal of Chromatography A 2012, 1247, 165-170. https://doi.org/10.1016/j.chroma.2012.05.077.

Supplemental Information

TABLE S1

Mass-labeled PFAS tracer compounds. The molecular formula includes deuterated/$^{13}$C information from the manufacturer (Wellington Laboratories).

| Abbreviation | Compound | Molecular Formula | PFAS Type | Concentration (ng/g) |
|---|---|---|---|---|
| M4PFBA | perfluorobutanoic acid | $^{13}C_4HF_7O_2$ | carboxylate | 22.118 |
| M5PFPeA | perfluoropentanoic acid | $^{13}C_5HF_9O_3$ | carboxylate | 22.118 |
| M5PFHxA | perfluorohexanoic acid | $^{13}C_5{}^{12}CHF_{11}O_2$ | carboxylate | 22.118 |
| M4PFHpA | perfluoroheptanoic acid | $^{13}C_4{}^{12}C_3HF_{13}O_2$ | carboxylate | 22.118 |
| M8PFOA | perfluorooctanoic acid | $^{13}C_8HF_{15}O_2$ | carboxylate | 22.118 |
| M9PFNA | perfluorononanoic acid | $^{13}C_9HF_{17}O_2$ | carboxylate | 22.118 |
| M6PFDA | perfluorodecanoic acid | $^{13}C_6{}^{12}C_4HF_{19}O_2$ | carboxylate | 22.118 |
| M7PFUdA | perfluoroundecanoic acid | $^{13}C_7{}^{12}C_4HF_{21}O_2$ | carboxylate | 22.118 |
| MPFDoA | perfluorododecanoic acid | $^{13}C_2{}^{12}C_{10}HF_{23}O_2$ | carboxylate | 22.118 |
| M2PFTeDA | perfluorododecanoic acid | $^{13}C_2{}^{12}C_{12}HF_{27}O_2$ | carboxylate | 22.118 |
| M8FOSA | perfluorooctane sulfonamide | $^{13}C_8H_2F_{17}NO_2S$ | sulfonamide | 22.118 |

TABLE S1-continued

Mass-labeled PFAS tracer compounds. The molecular formula includes deuterated/$^{13}$C information from the manufacturer (Wellington Laboratories).

| Abbreviation | Compound | Molecular Formula | PFAS Type | Concentration (ng/g) |
|---|---|---|---|---|
| d3-N-MeFOSAA | n-methylperfluoro-1-octanesulfonamidoacetic acid | $C_{11}D_3H_3F_{17}NO_4S$ | sulfonamidoacetic acid | 22.118 |
| d5-N-EtFOSAA | n-ethylperfluoro-1-octanesulfonamidoacetic acid | $C_{12}D_5H_3F_{17}NO_4S$ | sulfonamidoacetic acid | 22.118 |
| M3PFBS | perfluorobutyl sulfonate | $^{13}C_3{}^{12}CHF_9O_3S$ | sulfonate | 20.547 |
| M3PFHxS | perfluorohexyl sulfonate | $^{13}C_3{}^{12}C_3HF_{13}O_3S$ | sulfonate | 20.923 |
| M8PFOS | perfluorooctyl sulfonate | $^{13}C_8HF_{17}O_3S$ | sulfonate | 21.167 |
| M2-4:2FTS | 4:2 fluorotelomer sulfonate | $^{13}C_2{}^{12}C_4H_4F_9O_3SNa$ | fluorotelomer | 20.680 |
| M2-6:2FTS | 6:2 fluorotelomer sulfonate | $^{13}C_2{}^{12}C_6H_4F_{13}O_3SNa$ | fluorotelomer | 20.990 |
| M2-8:2FTS | 8:2 fluorotelomer sulfonate | $^{13}C_2{}^{12}C_8H_4F_{17}O_3SNa$ | fluorotelomer | 21.189 |
| MFHEA | 6:2 fluorotelomer carboxylic acid | $^{13}C_2{}^{12}C_6H_3F_{13}O_2$ | telomer acid | 23.002 |
| MFOEA | n-2-perfluorooctyl ethanoic acid | $^{13}C_2{}^{12}C_8H_3F_{17}O_2$ | telomer acid | 23.002 |
| MFDEA | n-2-perfluorodecyl ethanoic acid | $^{13}C_2{}^{12}C_{10}H_3F_{21}O_2$ | sulfonamidoacetic acid | 23.002 |
| M3HFPO-DA | hexafluoropropylene oxide dimer acid (Gen-X) | $^{13}C_3{}^{12}C_3HF_{11}O_3$ | n/a | 111.026 |
| d3-N-MeFOSA-M | n-methylperfluorooctane-1-sulfonamide | $C_9D_3HF_{17}NO_2S$ | sulfonamide | 118.144 |
| d5-N-EtFOSA-M | n-ethylperfluorooctane-1-sulfonamide | $C_{10}D_5HF_{17}NO_2S$ | sulfonamide | 111.379 |

TABLE S2

LC-MS/MS Analytical Conditions

| Chromatography Conditions - Thermo Scientific Vanquish UHPLC | |
|---|---|
| LC conditions | Column: Gemini Phenomenex 100 × 2 mm 3 μm<br>Gradient elution using Water and methanol both containing 5 mM of ammonium acetate<br>Oven temperature 40° C.<br>Flow rate: 0.5 mLmin$^{-1}$<br>Injection volume: 10 μL |
| Mass Spectrometry Analysis - Thermo Quantis | |
| Ion Source parameters: | Electrospray - negative mode<br>Ion Spray: 1500 V<br>Sheath Gas: 50 Arb<br>Auxilliar Gas: 10 Arb<br>Ion Transfer tube Temperature: 250° C.<br>Vaporizer temperature: 550° C. |

TABLE S3

Target PFAS Analytes SRM experiment - Scan parameters

| Analytes (abbreviation) | Precursor Ion (m/z) | Fragment Ion (m/z) | Collision Energy (V) | RF Lens (V) |
|---|---|---|---|---|
| PFBA | 213 | 168.9 | 11 | 75 |
| M3PFBA | 216 | 172 | 11 | 75 |
| M4PFBA | 217 | 172 | 11 | 75 |
| L-PFPrS-1 | 249.05 | 79.9 | 28.84 | 138 |
| L-PFPrS-2 | 249.05 | 98.9 | 25.68 | 138 |
| PFPeA | 263 | 219 | 11 | 64 |
| M5PFPeA | 268 | 223 | 11 | 64 |
| FBSA-1 | 297.95 | 77.9 | 24.8 | 144 |
| FBSA-2 | 297.95 | 118.9 | 17.97 | 144 |
| L-PFBS-1 | 298.975 | 79.9 | 32 | 152 |
| L-PFBS-2 | 298.975 | 98.9 | 28.46 | 152 |
| M3PFBS | 302 | 99 | 29 | 152 |
| PFHxA | 312.9 | 269 | 10 | 73 |
| M5PFHxA | 318 | 273 | 10 | 73 |
| 4:2FTS-2 | 326.962 | 81 | 28.5 | 138 |
| 4:2FTS-1 | 326.962 | 306.8 | 17.97 | 138 |
| M2-4:2FTS | 329 | 81 | 17.97 | 138 |
| HFPO-DA | 329 | 285 | 7 | 65 |
| PFPeS-1 | 348.975 | 79.9 | 34.28 | 174 |
| PFPeS-2 | 348.975 | 98.9 | 31.45 | 174 |
| PFHpA-1 | 362.9 | 169 | 17 | 81 |
| PFHpA-2 | 362.9 | 318.9 | 11 | 81 |
| M4PFHpA | 367 | 322 | 11 | 81 |
| FHEA | 376.9 | 293 | 20 | 100 |
| NaDONA | 377 | 251 | 10 | 280 |
| FHxSA-1 | 397.96 | 77.9 | 28.42 | 185 |
| FHxSA-2 | 397.96 | 377.9 | 20.33 | 185 |
| L-PFHxS-2 | 398.975 | 79.9 | 37.48 | 174 |
| L-PFHxS-1 | 398.975 | 98.9 | 34.95 | 174 |
| M3PFHxS | 402 | 99 | 35 | 151 |
| PFOA-1 | 413 | 169.0 | 19 | 94 |
| PFOA-2 | 413 | 368.9 | 11 | 94 |
| M2PFOA | 415 | 370 | 11 | 94 |
| M8PFOA | 421 | 376 | 11 | 94 |
| 6:2FTS-2 | 426.962 | 80.9 | 29.94 | 166 |
| 6:2FTS-1 | 426.962 | 406.9 | 21.39 | 166 |
| M2-6:2FTS-2 | 429 | 81 | 21.39 | 166 |
| M2-6:2FTS-1 | 429 | 376 | 21.39 | 166 |
| PFHpS-1 | 448.925 | 79.9 | 39.2 | 223 |
| PFHpS-2 | 448.925 | 98.9 | 37.56 | 223 |
| FOUEA | 456.9 | 392.9 | 12 | 100 |
| PFECHS-2 | 460.925 | 98.9 | 28.76 | 171 |
| PFECHS-1 | 460.925 | 380.9 | 26.15 | 171 |
| PFNA-1 | 463 | 218.9 | 16 | 101 |
| PFNA-2 | 463 | 418.9 | 12 | 101 |
| M9PFNA | 472 | 427 | 12 | 101 |
| FOEA | 476.9 | 393 | 18 | 100 |
| MFOEA-1 | 479.01 | 394 | 11 | 107 |
| N-AP-FHxSA-1 | 483.05 | 168.9 | 26.57 | 244 |

TABLE S3-continued

Target PFAS Analytes SRM experiment - Scan parameters

| Analytes (abbreviation) | Precursor Ion (m/z) | Fragment Ion (m/z) | Collision Energy (V) | RF Lens (V) |
|---|---|---|---|---|
| N-AP-FHxSA-2 | 483.05 | 318.9 | 21.55 | 244 |
| FOSA-I-1 | 497.962 | 77.9 | 30.44 | 206 |
| FOSA-I-2 | 497.962 | 477.9 | 23.16 | 206 |
| L-PFOS-1 | 498.925 | 79.9 | 40.26 | 214 |
| L-PFOS-2 | 498.925 | 98.9 | 40.55 | 214 |
| MPFOS-2 | 502.925 | 79.9 | 41.86 | 266 |
| MPFOS-1 | 502.925 | 98.8 | 41.86 | 266 |
| M8FOSA-I-2 | 505.95 | 77.9 | 30.4 | 196 |
| M8FOSA-I-1 | 505.95 | 485.9 | 22.94 | 196 |
| M8PFOS-1 | 507 | 80 | 44 | 259 |
| M8PFOS-2 | 507 | 99 | 44 | 259 |
| N-MeFOSA-M-2 | 511.962 | 168.9 | 26.23 | 187 |
| N-MeFOSA-M-1 | 511.962 | 219 | 23.62 | 187 |
| PFDA | 513 | 469 | 11 | 94 |
| 8Cl-PFOS-1 | 514.925 | 79.9 | 41.44 | 273 |
| 8Cl-PFOS-2 | 514.925 | 98.9 | 40.3 | 273 |
| d-N-MeFOSA-M-2 | 514.995 | 168.9 | 26.23 | 194 |
| d-N-MeFOSA-M-1 | 514.995 | 218.9 | 23.74 | 194 |
| MPFDA | 515 | 470 | 11 | 94 |
| M6PFDA | 519 | 474 | 11 | 94 |
| N-EtFOSA-M-2 | 525.962 | 168.9 | 26.69 | 209 |
| N-EtFOSA-M-1 | 525.962 | 219 | 24.04 | 209 |
| 8:2FTS-2 | 526.988 | 486.8 | 30.57 | 179 |
| 8:2FTS-1 | 526.988 | 506.8 | 24.76 | 179 |
| M2-8:2FTS | 529 | 81 | 24.76 | 179 |
| 9Cl-PF3ONS-1 | 530.838 | 350.9 | 24.71 | 155 |
| d-N-EtFOSA-M-3 | 530.925 | 169 | 26.69 | 203 |
| d-N-EtFOSA-M-2 | 530.925 | 219 | 24.76 | 203 |
| L-PFNS-1 | 548.975 | 80 | 42.99 | 280 |
| L-PFNS-2 | 548.975 | 98.9 | 42.78 | 280 |
| FOSAA-2 | 555.95 | 418.9 | 23.45 | 210 |
| FOSAA-1 | 555.95 | 497.8 | 26.06 | 210 |
| FDUEA | 557 | 493 | 21 | 280 |
| PFUnDA | 563 | 518.9 | 11 | 116 |
| N-MeFOSAA-1 | 569.975 | 418.8 | 18.18 | 178 |
| N-MeFOSAA-2 | 569.975 | 482.8 | 14.39 | 178 |
| M7PFUnDA-2 | 570 | 525 | 11 | 116 |
| d3-N-MeFOSAA-1 | 572.962 | 418.9 | 18.56 | 174 |
| d3-N-MeFOSAA-2 | 572.962 | 482.8 | 14.06 | 174 |
| FDEA | 576.8 | 493 | 8 | 100 |
| N-EtFOSAA-2 | 583.962 | 418.9 | 18.52 | 179 |
| N-EtFOSAA-1 | 583.962 | 525.9 | 18.1 | 179 |
| d5-N-EtFOSAA-2 | 589.012 | 418.9 | 19.15 | 176 |
| d5-N-EtFOSAA-1 | 589.012 | 530.9 | 19.36 | 176 |
| L-PFDS-1 | 598.925 | 79.9 | 44.51 | 280 |
| L-PFDS-2 | 598.925 | 98.9 | 46.87 | 280 |
| PFDoDA-2 | 612.925 | 318.9 | 17.51 | 129 |
| PFDoDA-1 | 612.925 | 568.9 | 9.8 | 129 |
| MPFDoA | 615 | 570 | 9.8 | 129 |
| 10:2FTS-2 | 626.95 | 80.9 | 34.19 | 280 |
| 10:2FTS-1 | 626.95 | 606.8 | 29.01 | 280 |
| HCl-PF3OUdS | 630.95 | 450.8 | 27.2 | 225 |
| SAmPAP-1 | 650 | 526 | 25 | 280 |
| PFTrDA-2 | 662.812 | 318.9 | 18.98 | 136 |
| PFTrDA-1 | 662.812 | 618.9 | 10.73 | 136 |
| L-PFDoS-1 | 698.925 | 80 | 55 | 280 |
| L-PFDoS-3 | 698.925 | 99 | 55 | 280 |
| 6:6PFPi | 700.9 | 400.9 | 55 | 188 |
| PFTeDA | 713 | 669 | 12 | 107 |
| M2PFTeDA | 715 | 670 | 12 | 107 |
| 6:2diPAP-2 | 788.925 | 96.9 | 29.3 | 216 |
| 6:2diPAP-1 | 788.925 | 442.9 | 17.05 | 216 |
| 6:8PFPi-2 | 800.9 | 400.9 | 55 | 188 |
| 6:8PFPi-1 | 800.9 | 500.8 | 55 | 188 |
| PFHxDA-2 | 812.875 | 418.9 | 20.42 | 167 |
| PFHxDA-1 | 812.875 | 768.8 | 11.95 | 167 |
| 6:2/8:2diPAP | 889 | 443 | 20 | 280 |
| PFODA-2 | 912.888 | 318.8 | 25.05 | 188 |
| PFODA-1 | 912.888 | 868.8 | 13.3 | 188 |
| 8:2diPAP-2 | 988.888 | 522.9 | 27.11 | 280 |
| 8:2diPAP | 989 | 543 | 20 | 280 |
| diSAmPAP | 1202.95 | 525.9 | 25 | 280 |

*-1 and -2 means first and second transition of the analyte—first transition used for quantitation and second transition for confirmation.

TABLE S4

PFAS standard compounds and corresponding mass-labeled compounds used to develop calibration curves. When the same compound was not available as mass-labeled, the closest retention time labeled compound was selected. Detection and quantification limits (LOD and LOQ) reflect concentrations in the 4-mL solvent-eluted samples. In order to compare these values to leachate concentrations, multiply the instrument detection limit by the ratio between volumes, in this case, 4 mL divided by the extracted volume of each leachate sample (approximately 50 mL).

| Abbreviation | Compound | PFAS Type | Correlative Labeled Compound | LOD (ng/L) | LOQ (ng/L) |
|---|---|---|---|---|---|
| PFBA | perfluorobutanoic acid | carboxylate | M4PFBA | 4.18 | 8.09 |
| PFPrS | perfluoropropane sulfonate | sulfonate | M5PFPeA | 1.66 | 6.42 |
| PFPeA | perfluoropentanoic acid | carboxylate | M5PFPeA | 20.92 | 182.15 |
| PFBS | perfluorobutyl sulfonate | sulfonate | M3PFBS | 3.70 | 18.52 |
| FBSA | perfluorobutane sulfonamide | sulfonamide | M3PFBS | 80.74 | 398.28 |
| 4:2FTS | 4:2 fluorotelomer sulfonate | telomer sulfonate | M24:2FTS | 3.91 | 19.56 |
| PFHxA | perfluorohexanoic acid | carboxylate | M5PFHxA | 4.18 | 20.92 |
| PFPeS | perfluoropentane sulfonate | sulfonate | M3HFPO-DA | 3.93 | 19.67 |
| PFHxS | perfluorohexyl sulfonate | sulfonate | M3PFHxS | 19.08 | 35.46 |
| PFHpA | perfluoroheptanoic acid | carboxylate | M4PFHpA | 4.18 | 20.92 |
| NaDONA | dodecafluoro-3H-4,8-dioxanonanoate | other | M4PFHpA | 76.85 | 379.09 |
| FHEA | 6:2 fluorotelomer carboxylic acid | telomer acid | M4PFHpA | 35.40 | 165.86 |
| AP-FHxSA | | | M26:2FTS | 32.48 | 362.66 |
| PFECHS | n-decafluoro-4 ethylcyclohexanesulfonate | cyclic | M26:2FTS | 3.32 | 16.59 |
| FHxSA | perfluorohexane sulfonamide | sulfonamide | M3PFHxS | 9.76 | 36.26 |
| 6:2FTS | 6:2 fluorotelomer sulfonate | telomer sulfonate | M26:2FTS | 3.97 | 19.87 |
| PFHpS | perfluoroheptane sulfonate | sulfonate | M26:2FTS | 9.94 | 36.93 |
| PFOA | perfluorooctanoic acid | carboxylate | M8PFOA | 10.46 | 38.88 |

TABLE S4-continued

PFAS standard compounds and corresponding mass-labeled compounds used to develop calibration curves. When the same compound was not available as mass-labeled, the closest retention time labeled compound was selected. Detection and quantification limits (LOD and LOQ) reflect concentrations in the 4-mL solvent-eluted samples. In order to compare these values to leachate concentrations, multiply the instrument detection limit by the ratio between volumes, in this case, 4 mL divided by the extracted volume of each leachate sample (approximately 50 mL).

| Abbreviation | Compound | PFAS Type | Correlative Labeled Compound | LOD (ng/L) | LOQ (ng/L) |
|---|---|---|---|---|---|
| PFOS | perfluorooctyl sulfonate | sulfonate | M8PFOS | 19.36 | 81.44 |
| PFNA | perfluorononanoic acid | carboxylate | M9PFNA | 4.18 | 20.92 |
| Cl-PFOS | 8-chlorohexadecafluoro-3-oxaoctane-1-sulfonate | other | M8PFOS | 17.06 | 71.76 |
| FOEA | n-2-perfluorooctyl ethanoic acid | telomer acid | MFOEA | 35.92 | 168.30 |
| FOUEA | 2H-perfluoro-2-decanoic acid | unsaturated telomer acid | MFOEA | 3.18 | 6.14 |
| Cl-PF3ONS | 9-chlorohexadecafluoro-3-oxanonane-1-sulfonate | other | M28:2FTS | 3.30 | 6.38 |
| FOSAA | 2-perfluorooctanesulfonamido acetic acid | sulfonamidoacetic acid | M28:2FTS | 8.83 | 17.65 |
| PFNS | perfluorononane sulfonate | sulfonate | M28:2FTS | 10.04 | 84.48 |
| 8:2FTS | 8:2 fluorotelomer sulfonate | telomer sulfonate | M28:2FTS | 20.08 | 37.32 |
| FOSA | perfluoro-1-octanesulfonamide | sulfonamide | M8FOSA | 8.09 | 38.88 |
| PFDA | Perfluorodecanoic acid | carboxylate | M6PFDA | 1.62 | 8.09 |
| N-MeFOSAA | N-methylperfluoro-1-octanesulfonamidoacetic acid | sulfonamidoacetic acid | d3-N-MeFOSAA | 8.09 | 88.00 |
| PFDS | perfluorodecane sulfonate | sulfonate | d5-N-EtFOSAA | 20.19 | 84.92 |
| PFUnDA | perfluoroundecanoic acid | carboxylate | M7PFUnDA | 4.18 | 20.92 |
| N-EtFOSAA | N-ethylperfluoro-1-octanesulfonamidoacetic acid | sulfonamidoacetic acid | d5-N-EtFOSAA | 20.92 | 88.00 |
| FDUEA | n-2-perfluorodecyl ethanoic acid | unsaturated telomer acid | M7PFUnDA | 1711.28 | 13092.94 |
| FDEA | n-2-perfluorodecyl ethanoic acid | saturated telomer acid | M7PFUnDA | 35.67 | 167.14 |
| Cl-PF3OUdS | 11-chloroeicosafluoro-3-oxaundecane-1-sulfonate | other | d5-N-EtFOSAA | 3.39 | 6.55 |
| N-MeFOSA | N-methylperfluorooctane sulfonamide | sulfonamide | d-N-MeFOSA | 3.58 | 33.29 |
| PFDoDA | perfluorododecanoic acid | carboxylate | MPFDoDA | 4.18 | 8.09 |
| 10:2FTS | 10:2 fluorotelomer sulfonate | telomer sulfonate | MPFDoDA | 8.68 | 32.24 |
| 6:6PFPi | sodium bis(perfluorohexyl)phosphinate | perfluoroalkyl-phosphinate | MPFDoDA | 3.45 | 17.23 |
| N-EtFOSA | N-ethylperfluorooctane sulfonamide | sulfonamide | d-N-EtFOSA | 17.43 | 32.39 |
| PFDoDS | perfluorododecane sulfonate | sulfonate | MPFDoDA | 17.13 | 31.83 |
| PFTriDA | perfluorotridecanoic acid | carboxylate | d-N-EtFOSA | 6.97 | 8.09 |
| 6:2diPAP | 6:2 fluorotelomer phosphate diester | phosphate ester | M2PFTeDA | 3.66 | 18.29 |
| PFTreDA | perfluorotetradecanoic acid | carboxylate | M2PFTeDA | 4.18 | 20.92 |
| 6:8PFPi | sodium perfluorohexylperfluoro-octylphosphinate | perfluoroalkyl-phosphinate | M2PFTeDA | 1.78 | 8.89 |
| 6:2/8:2diPAP | | | M2PFTeDA | 6.94 | 33.34 |
| PFHxDA | perfluorohexadecanoic acid | carboxylate | M2PFTeDA | 3.16 | 6.12 |
| 8:2diPAP | 6:2 fluorotelomer phosphate diester | phosphate ester | M2PFTeDA | 9.00 | 33.46 |
| PFODA | perfluorooctadecanoic acid | carboxylate | M2PFTeDA | 3.51 | 6.80 |
| diSAmPAP | sodium bis-(2-N-ethylperfluorooctane-1-sulfonamido)ethyl | phosphate ester | M2PFTeDA | 15.68 | 29.13 |

TABLE S5

Extraction efficiency experiment result details.
Compounds are listed in increasing order of retention time.

| Compound | Extraction Efficiency (%) | | | Total Extraction Efficiency (%) | | | Evaporation Loss (%) | |
|---|---|---|---|---|---|---|---|---|
| | Leachate | Foam | Δ | Leachate | Foam | Δ | Leachate | Foam |
| PFBA | 114 | 147 | 34 | 107 | 95 | −12 | 6 | 52 |
| PFPeA | 104 | 115 | 11 | 88 | 84 | −4 | 16 | 31 |
| PFBS | 84 | 131 | 47 | 73 | 100 | 27 | 11 | 31 |
| PFHxA | 93 | 106 | 14 | 79 | 91 | 11 | 14 | 16 |
| PFHxS | 106 | 128 | 21 | 80 | 92 | 12 | 26 | 36 |
| PFHpA | 102 | 113 | 11 | 82 | 93 | 11 | 21 | 20 |
| 6:2 FTS | 84 | 99 | 16 | 70 | 85 | 15 | 13 | 14 |
| PFOA | 101 | 108 | 6 | 80 | 88 | 7 | 21 | 20 |
| PFOS | 104 | 108 | 5 | 73 | 104 | 31 | 31 | 4 |
| PFNA | 100 | 110 | 10 | 77 | 88 | 11 | 22 | 22 |
| FOE A | 85 | 90 | 5 | 71 | 73 | 2 | 14 | 16 |
| 8:2 FTS | 75 | 93 | 18 | 51 | 86 | 35 | 24 | 7 |
| FOSA | 64 | 59 | −4 | 46 | 46 | 0 | 17 | 13 |
| PFDA | 85 | 84 | −1 | 61 | 69 | 8 | 24 | 14 |
| N-MeFOSAA | 73 | 79 | 6 | 55 | 64 | 10 | 18 | 15 |
| N-Et-FOSAA | 72 | 66 | −7 | 53 | 54 | 1 | 20 | 12 |
| PFUnDA | 65 | 64 | −1 | 45 | 51 | 6 | 20 | 13 |
| N-MeFOSA | 57 | 54 | −3 | 38 | 42 | 5 | 20 | 12 |
| PFDoDA | 44 | 43 | −1 | 31 | 34 | 3 | 13 | 9 |
| N-EtFOSA | 54 | 42 | −12 | 37 | 35 | −2 | 16 | 7 |
| PFTeDA | 19 | 17 | −2 | 14 | 14 | 0 | 6 | 3 |
| MEAN | 80.1 | 88.3 | 8.2 | 62.4 | 70.8 | 8.4 | 17.7 | 17.5 |

TABLE S6

Comparison of landfill leachate extraction efficiency results from previous reports, values are in %. The comparison was made for PFAS evaluated in common with this study, most of these studies included additional compounds not listed here. Current solid phase extraction methods for PFAS in leachate vary between researchers. The procedure used in this study features commonly employed materials, such as WAX cartridges[1,2], methanolic ammonium hydroxide[1,2] (however, the concentration varies), and methanol, which was used in some portion of all SPE approaches referenced. Other efficiency experiment results in the literature, which were not included in this table, such as Li et al.[5], which reported a range of recoveries (20% to 120%) for all compounds and not individual PFAS, and Gonzalez-Barreiro et al.[6], which also reported similar recoveries for two SPE methods (ranging from 11% to 96% for Method A and 8% to 102% for Method B) using wastewater effluent, had comparable results. Optimization of PFAS extraction protocols for multiple compounds with a wide variety of extraction behaviors is a challenge, and thus, solid phase extraction efficiency for different compounds varies widely (i.e., from 8% to 160%) among these studies; this method resulted in a comparable range (19% to 114%). Community-wide efforts aimed at harmonizing/standardizing PFAS measurement in leachate (e.g., development of a Standard Reference Material) would provide a means to better evaluate these workflows.

| | This study | Benskin et al. (2010)[1] | Busch et al. (2010)[2] | Huset et al. (2011)[3] | Allred et al. (2014)[4] |
|---|---|---|---|---|---|
| Extraction Type | SPE | SPE | SPE | SPE | LLE |
| PFBA | 114 | 54 | 53 ± 21 | 25 ± 5 | 11 |
| PFPeA | 104 | 68* | | 39 ± 8 | 41 |
| PFBS | 84 | 68* | | 54 ± 2 | |
| PFHxA | 93 | 121 | 47 ± 17 | 64 ± 9 | 92 |
| PFHxS | 106 | 102* | 49 ± 19 | 80 ± 3 | 100 |
| PFHpA | 102 | 137* | | 110 ± 12 | |
| 6:2 FTS | 84 | | | 74 ± 2 | 100 |
| PFOA | 101 | 136 | 50 ± 19 | 72 ± 16 | 100 |
| PFOS | 104 | 96 | 60 ± 24 | 69 ± 1 | 110 |
| PFNA | 100 | 139 | 54 ± 23 | 120 ± 18 | 100 |
| FOEA | 85 | 103 | 45 ± 22 | | 110 |
| 8:2 FTS | 75 | | | 94 ± 7 | |
| FOSA | 64 | 132* | | 110 ± 8 | |
| PFDA | 85 | 146* | 48 ± 22 | 73 ± 7 | 110 |
| MeFOSAA | 73 | 123* | | 71 ± 4 | 100 |
| EtFOSAA | 72 | 116* | | 65 ± 3 | 110 |
| PFUnDA | 65 | 160* | 47 ± 20 | 44 ± 3 | 100 |
| MeFOSA | 57 | | 60 ± 23 | | |

TABLE S6-continued

Comparison of landfill leachate extraction efficiency results from previous reports, values are in %. The comparison was made for PFAS evaluated in common with this study, most of these studies included additional compounds not listed here. Current solid phase extraction methods for PFAS in leachate vary between researchers. The procedure used in this study features commonly employed materials, such as WAX cartridges[1,2], methanolic ammonium hydroxide[1,2] (however, the concentration varies), and methanol, which was used in some portion of all SPE approaches referenced. Other efficiency experiment results in the literature, which were not included in this table, such as Li et al.[5], which reported a range of recoveries (20% to 120%) for all compounds and not individual PFAS, and Gonzalez- Barreiro et al.[6], which also reported similar recoveries for two SPE methods (ranging from 11% to 96% for Method A and 8% to 102% for Method B) using wastewater effluent, had comparable results. Optimization of PFAS extraction protocols for multiple compounds with a wide variety of extraction behaviors is a challenge, and thus, solid phase extraction efficiency for different compounds varies widely (i.e., from 8% to 160%) among these studies; this method resulted in a comparable range (19% to 114%). Community-wide efforts aimed at harmonizing/standardizing PFAS measurement in leachate (e.g., development of a Standard Reference Material) would provide a means to better evaluate these workflows.

|  | This study | Benskin et al. (2010)[1] | Busch et al. (2010)[2] | Huset et al. (2011)[3] | Allred et al. (2014)[4] |
|---|---|---|---|---|---|
| PFDoA | 44 | 144* | 45 ± 20 | 34 ± 6 | 100 |
| EtFOSA | 54 |  | 54 ± 18 |  |  |
| PFTeDA | 19 | 155* |  | 8 ± 3 |  |

*Results for these compounds are for non-mass-labeled standards, the remaining extraction efficiencies are for mass-labeled.

References for supplemental information

[1] Benskin, J. P.; Ikonomou, M. G.; Woudneh, M. B.; Cosgrove, J. R. Rapid Characterization of Perfluoroalkyl Carboxylate, Sulfonate, and Sulfonamide Isomers by High-Performance Liquid Chromatography-Tandem Mass Spectrometry. *J. Chromatogr. A* 2012, 1247, 165-170.https://doi.org/10.1016/j.chroma.2012.05.077.

[2] Busch, J.; Ahrens, L.; Sturm, R.; Ebinghaus, R. Polyfluoroalkyl Compounds in Landfill Leachates. *Environ. Pollut.* 2010, 758(5), 1467-1471. https://doi.org/10.1016/j.envpol.2009.12.031.

[3] Huset, C. A.; Barlaz, M. A.; Barofsky, D. F.; Field, J. A. Quantitative Determination of Fluorochemicals in Municipal Landfill Leachates. *Chemosphere* 2011, 82 (10), 1380-1386. https://doi.org/10.1016/j.chemosphere.2010.11.072.

[4] Allred, B. M.; Lang, J. R.; Barlaz, M. A.; Field, J. A. Orthogonal Zirconium Diol/C18 Liquid Chromatography-Tandem Mass Spectrometry Analysis of Poly and Perfluoroalkyl Substances in Landfill Leachate. *J. Chromatogr. A* 2014, 1359, 202-211. https://doi.org/10.1016/j.chroma.2014.07.056.

[5] Li, B.; Danon-Schaffer, M. N.; Li, L. Y.; Ikonomou, M. G.; Grace, J. R. Occurrence of PFCs and PBDEs in Landfill Leachates from Across Canada. *Water. Air. Soil Pollut.* 2012, 223 (6), 3365-3372. https://doi.org/10.1007/s11270-012-1115-7.

[6] González-Barreiro, C.; Martinez-Carballo, E.; Sitka, A.; Scharf, S.; Gans, O. Method Optimization for Determination of Selected Perfluorinated Alkylated Substances in Water Samples. *Anal. Bioanal. Chem.* 2006, 386 (7), 2123-2132. https://doi.org/10.1007/s00216-006-0902-7.

Example 2

The laboratory experiment described in Example 1 was used to design a field application of foam separation of PFAS in landfill leachate. The field unit includes a simple, portable, two-stage PFAS separation unit which will use foam flotation followed by either membrane or sorbent separation to concentrate PFAS in a low volume waste stream. Additional laboratory studies will be used to optimize (based on site-specific matrix characteristics and PFAS contamination) the design and construction of a deployable unit which uses bubble aeration to produce and separate a PFAS-rich foam, which will be separated and undergo additional separation, stabilization and/or destructive treatment. In the field unit, PFAS concentrations in the treated water as well as air effluent will be monitored. The schematic included in FIG. 8 includes an additional apparatus similar to that described in EPA OTM-45, a method in development for the measurement of volatile and semi-volatile PFAS in gases.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A method of separating per- and/or polyfluoroalkyl compounds (PFAS compounds) from a wastewater leachate contaminated with PFAS compounds, comprising:
    flowing the wastewater leachate contaminated with PFAS compounds along a path, wherein the path is a serpentine path, a curving path, a winding path, or a sinuous path;
    foaming the wastewater leachate as the wastewater leachate flows along the path for a period of time to form a foam layer on top of the wastewater leachate and a de-foamed wastewater leachate, wherein the foam layer comprises a concentrated amount of PFAS compounds relative to that present in the wastewater leachate, wherein the de-foamed wastewater leachate has a lower concentration of total PFAS compounds than the wastewater leachate; and
    separating the foam layer at multiple points along the path from the de-foamed wastewater leachate using a skimmer, a baffle, or both, wherein the separating occurs as the de-foamed wastewater leachate flows past the skimmer or baffle;
    flowing the de-foamed wastewater leachate directly back into the wastewater leachate and optionally
    processing the foam layer.

2. The method of claim 1, wherein foaming includes bubble aeration of the wastewater leachate.

3. The method of claim 2, wherein the bubble aeration includes artificial bubble aeration introduced using a bubble aeration system.

4. The method of claim 3, wherein the bubble aeration system includes producing bubbles within the wastewater leachate as the wastewater leachate flows along the path for a period of time sufficient to form the foam layer.

5. The method of claim 4, wherein the bubbles have a sufficient bubble size and air-to-liquid volume, and contact time with the wastewater leachate to form the foam layer.

6. The method of claim 3, wherein the separating step and the foaming step occur concurrently.

7. The method of claim 3, wherein the foaming step and separating step occurs sequentially.

8. The method of claim 1, wherein separating the foam layer form the wastewater leachate includes skimming, at multiple points along the path, the foam layer from the top of the de-foamed wastewater leachate as the de-foamed wastewater leachate flows past the skimmer.

9. The method of claim 1, wherein the PFAS compounds include perfluorooctanoic acid (PFOA), perfluorooctanesulfonic acid (PFOS), or a combination thereof.

10. The method of claim 1, wherein the method includes processing, wherein processing includes processing the foam layer after separation to render the PFAS compounds less hazardous relative to before processing than PFAS compounds.

11. The method of claim 10, wherein processing includes processing using an electron beam, processing using a plasma, processing by incineration, processing by oxidation, or a combination thereof.

12. The method of claim 7, wherein the method alternates between forming and separation.

13. The method of claim 12, wherein the bubble aeration system includes producing bubbles within the wastewater leachate as the wastewater leachate flows along the path for a period of time sufficient to form the foam layer.

14. The method of claim 13, wherein the bubbles have a sufficient bubble size and air-to-liquid volume, and contact time with the wastewater leachate to form the foam layer.

15. The method of claim 14, wherein separating the foam layer form the wastewater leachate includes skimming, at multiple points along the path, the foam layer from the top of the de-foamed wastewater leachate as the de-foamed wastewater leachate flows past the skimmer.

16. The method of claim 15, wherein the PFAS compounds include perfluorooctanoic acid (PFOA), perfluorooctanesulfonic acid (PFOS), or a combination thereof.

17. The method of claim 16, wherein the method includes processing, wherein processing includes processing the foam layer after separation to render the PFAS compounds less hazardous relative to before processing the PFAS compounds.

18. The method of claim 17, wherein processing includes processing using an electron beam, processing using a plasma, processing by incineration, processing by oxidation, or a combination thereof.

19. The method of claim 1, wherein:

flowing the wastewater leachate contaminated with PFAS compounds comprises flowing the wastewater leachate through a housing configured to float in a body of wastewater leachate, wherein the housing comprises:
  one or more inlets in fluidic communication with the body of the wastewater leachate;
  an internal fluidic chamber comprising a serpentine path, a curving path, a winding path, or a sinuous path;
  a bubble aeration device configured to foam the wastewater leachate as the wastewater leachate moves through the internal fluidic chamber; and
  one or more outlets configured to return the de-foamed wastewater leachate to the body of wastewater leachate;

foaming the wastewater leachate comprises foaming the wastewater leachate using the bubble aeration device as the wastewater leachate flows through the internal fluidic chamber of the housing for a period of time to form a foam layer on top of the wastewater leachate and a de-foamed wastewater leachate, wherein the foam layer comprises a concentrated amount of PFAS compounds relative to that present in the wastewater leachate, wherein the de-foamed wastewater leachate has a lower concentration of total PFAS compounds than the wastewater leachate;

separating the foam layer comprises separating the foam layer at multiple points along the internal fluidic chamber from the de-foamed wastewater leachate using a skimmer, a baffle, or both, wherein the separating occurs as the de-foamed wastewater leachate flows past the skimmer or baffle; and flowing the de-foamed wastewater leachate comprises flowing the de-foamed wastewater leachate through one or more outlets of the housing directly back into the wastewater leachate; and optionally processing the foam layer further comprises returning a treated water to the body of wastewater leachate.

* * * * *